United States Patent
Clark et al.

(10) Patent No.: US 10,100,633 B2
(45) Date of Patent: Oct. 16, 2018

(54) MAGNETIC DETECTION OF DRILL PIPE CONNECTIONS

(71) Applicant: Schlumberger Technology Corporation, Sugar Land, TX (US)

(72) Inventors: Brian Oliver Clark, Sugar Land, TX (US); Jacques Orban, Katy, TX (US); William Puccio, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/244,257

(22) Filed: Aug. 23, 2016

(65) Prior Publication Data
US 2018/0058195 A1   Mar. 1, 2018

(51) Int. Cl.
| E21B 17/01 | (2006.01) |
| G01V 3/26 | (2006.01) |
| E21B 33/035 | (2006.01) |
| E21B 47/09 | (2012.01) |
| E21B 17/00 | (2006.01) |
| E21B 33/06 | (2006.01) |

(52) U.S. Cl.
CPC ........ *E21B 47/0905* (2013.01); *E21B 17/003* (2013.01); *E21B 17/01* (2013.01); *E21B 33/035* (2013.01); *E21B 33/063* (2013.01); *G01V 3/26* (2013.01)

(58) Field of Classification Search
CPC .. E21B 47/0905; E21B 17/003; E21B 33/035; E21B 33/063; G01V 3/26
See application file for complete search history.

(56) References Cited

U.S. PATENT DOCUMENTS

| 6,720,764 B2 * | 4/2004 | Relton ................... E21B 19/00 166/255.1 |
| 7,347,261 B2 * | 3/2008 | Markel ............... E21B 47/0905 166/255.1 |
| 9,273,547 B2 * | 3/2016 | Brooks ................. E21B 47/022 |
| 2005/0055163 A1 * | 3/2005 | Hopper .................. E21B 41/00 702/6 |
| 2014/0374159 A1 * | 12/2014 | McElhinney ............. E21B 7/04 175/45 |
| 2015/0338541 A1 * | 11/2015 | Nichols .................... G01V 3/26 324/338 |

OTHER PUBLICATIONS

Andarawis, Emad, "Intelligent BOP RAM Actuation Sensor Systems," Presented at RPSEA / SPE-GCS Ultra-Deepwater Technology Conference, Sep. 9-10, 2015, 21 pages, Houston, TX.

* cited by examiner

*Primary Examiner* — Matthew R Buck
*Assistant Examiner* — Douglas S Wood

(57) ABSTRACT

A system for determining a location of a drill pipe joint deployed in a bore includes at least one magnetometer deployed on the bore. A processor is in electronic communication with the magnetometer and is configured to process magnetic field measurements made by the magnetometer to determine at least one of an axial position and a lateral position of the drill pipe joint.

22 Claims, 17 Drawing Sheets

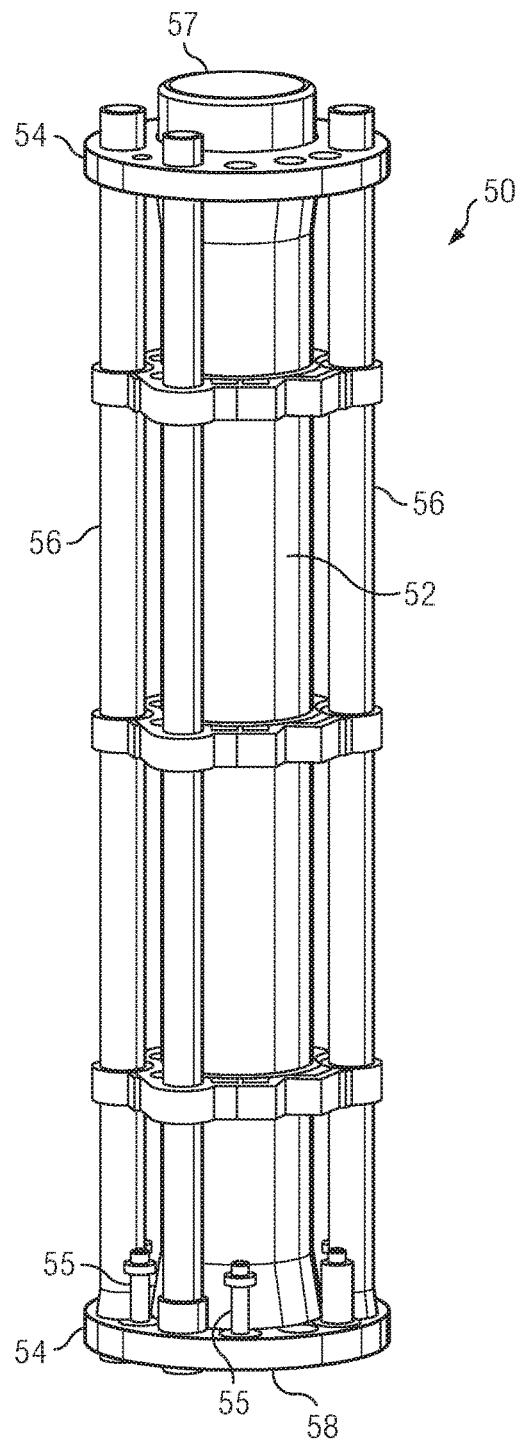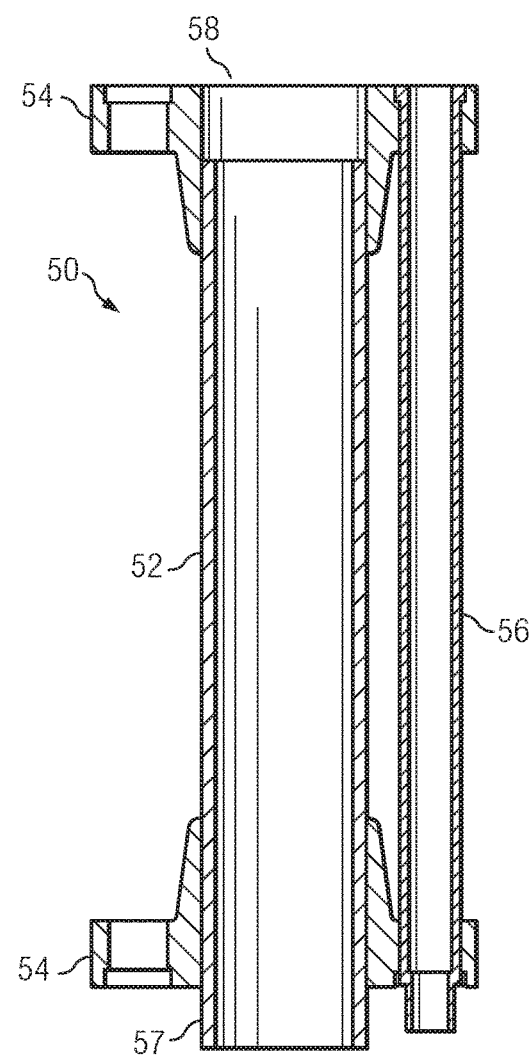
FIG. 2
(PRIOR ART)
FIG. 3
(PRIOR ART)

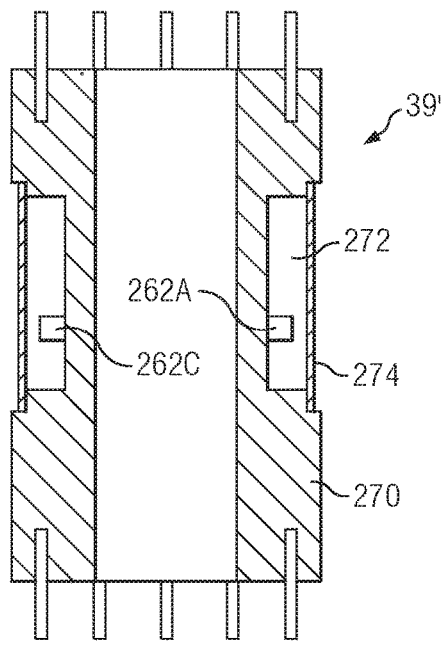
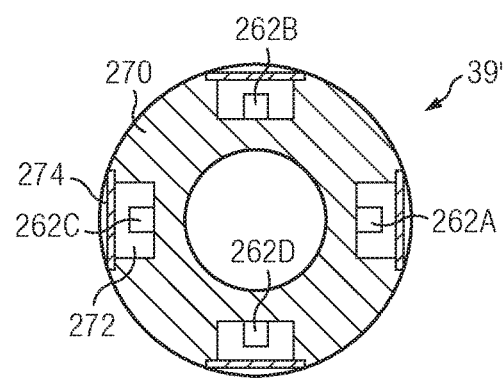
FIG. 19A
FIG. 19B
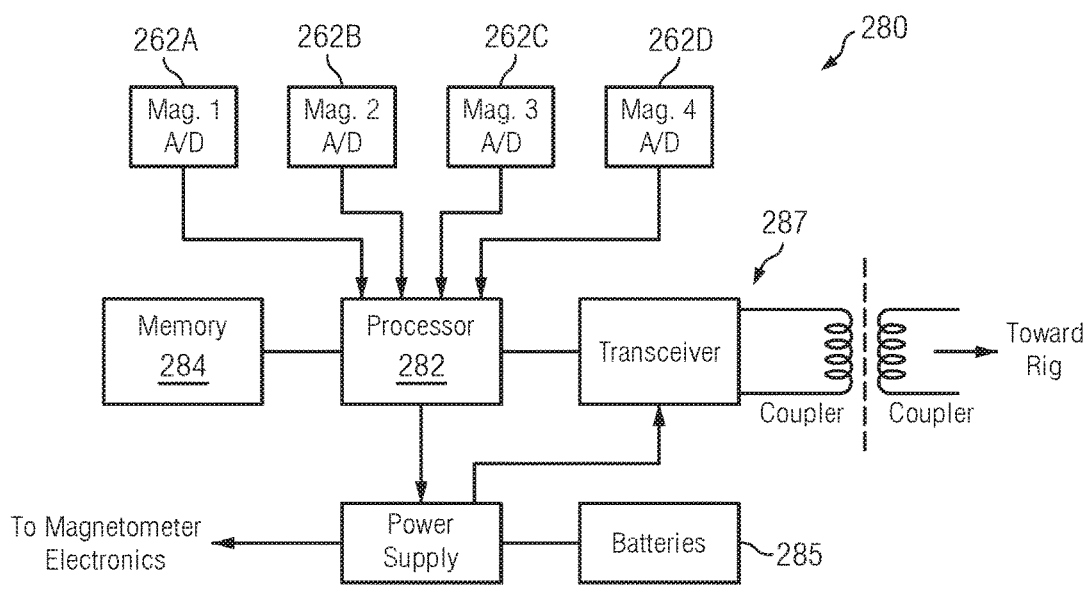
FIG. 19C

FIG. 22A

| $B_{1\theta}/B_{1R}$ | X0=-6 | -5 | -4 | -3 | -2 | -1 | 0 | 1 | 2 | 3 | 4 | 5 | 6 |
|---|---|---|---|---|---|---|---|---|---|---|---|---|---|
| Y0=-6 |  |  |  |  |  | 0.286 | 0 | -0.286 |  |  |  |  |  |
| -5 |  |  |  | 0.667 | 0.444 | 0.222 | 0 | -0.222 | -0.444 | -0.667 |  |  |  |
| -4 |  |  | 0.727 | 0.545 | 0.364 | 0.182 | 0 | -0.182 | -0.364 | -0.545 | -0.727 |  |  |
| -3 |  | 0.769 | 0.615 | 0.462 | 0.308 | 0.154 | 0 | -0.154 | -0.308 | -0.462 | -0.615 | -0.769 |  |
| -2 |  | 0.667 | 0.533 | 0.400 | 0.267 | 0.133 | 0 | -0.133 | -0.267 | -0.400 | -0.533 | -0.667 |  |
| -1 | 0.706 | 0.588 | 0.471 | 0.353 | 0.235 | 0.118 | 0 | -0.118 | -0.235 | -0.353 | -0.471 | -0.588 | -0.706 |
| 0 | 0.632 | 0.526 | 0.421 | 0.316 | 0.211 | 0.105 | 0 | -0.105 | -0.211 | -0.316 | -0.421 | -0.526 | -0.632 |
| 1 | 0.571 | 0.476 | 0.381 | 0.286 | 0.190 | 0.095 | 0 | -0.095 | -0.190 | -0.286 | -0.381 | -0.476 | -0.571 |
| 2 |  | 0.435 | 0.348 | 0.261 | 0.174 | 0.087 | 0 | -0.087 | -0.174 | -0.261 | -0.348 | -0.435 |  |
| 3 |  | 0.400 | 0.320 | 0.240 | 0.160 | 0.080 | 0 | -0.080 | -0.160 | -0.240 | -0.320 | -0.400 |  |
| 4 |  |  | 0.296 | 0.222 | 0.148 | 0.074 | 0 | -0.074 | -0.148 | -0.222 | -0.296 |  |  |
| 5 |  |  |  | 0.207 | 0.138 | 0.069 | 0 | -0.069 | -0.138 | -0.207 |  |  |  |
| Y0=6 |  |  |  |  |  | 0.065 | 0 | -0.065 |  |  |  |  |  |

FIG. 22B

| $B_{2\theta}/B_{2R}$ | X0=-6 | -5 | -4 | -3 | -2 | -1 | 0 | 1 | 2 | 3 | 4 | 5 | 6 |
|---|---|---|---|---|---|---|---|---|---|---|---|---|---|
| Y0=-6 |  |  |  |  |  | -0.571 | -0.632 | -0.706 |  |  |  |  |  |
| -5 |  |  |  | -0.400 | -0.435 | -0.476 | -0.526 | -0.588 | -0.667 | -0.769 |  |  |  |
| -4 |  |  | -0.296 | -0.320 | -0.348 | -0.381 | -0.421 | -0.471 | -0.533 | -0.615 | -0.727 |  |  |
| -3 |  | -0.207 | -0.222 | -0.240 | -0.261 | -0.286 | -0.316 | -0.353 | -0.400 | -0.462 | -0.545 | -0.667 |  |
| -2 |  | -0.138 | -0.148 | -0.160 | -0.174 | -0.190 | -0.211 | -0.235 | -0.267 | -0.308 | -0.364 | -0.444 |  |
| -1 | -0.065 | -0.069 | -0.074 | -0.080 | -0.087 | -0.095 | -0.105 | -0.118 | -0.133 | -0.154 | -0.182 | -0.222 | -0.286 |
| 0 | 0 | 0 | 0 | 0 | 0 | 0 | 0 | 0 | 0 | 0 | 0 | 0 | 0 |
| 1 | 0.065 | 0.069 | 0.074 | 0.080 | 0.087 | 0.095 | 0.105 | 0.118 | 0.133 | 0.154 | 0.182 | 0.222 | 0.286 |
| 2 |  | 0.138 | 0.148 | 0.160 | 0.174 | 0.190 | 0.211 | 0.235 | 0.267 | 0.308 | 0.364 | 0.444 |  |
| 3 |  | 0.207 | 0.222 | 0.240 | 0.261 | 0.286 | 0.316 | 0.353 | 0.400 | 0.462 | 0.545 | 0.667 |  |
| 4 |  |  | 0.296 | 0.320 | 0.348 | 0.381 | 0.421 | 0.471 | 0.533 | 0.615 | 0.727 |  |  |
| 5 |  |  |  | 0.400 | 0.435 | 0.476 | 0.526 | 0.588 | 0.667 | 0.769 |  |  |  |
| Y0=6 |  |  |  |  |  | 0.571 | 0.632 | 0.706 |  |  |  |  |  |

FIG. 22C

| Y0=-6 | | -5 | -4 | -3 | -2 | -1 | 0 | 1 | 2 | 3 | 4 | 5 | 6 | |
|---|---|---|---|---|---|---|---|---|---|---|---|---|---|---|
| X0=-6 | B3θ/B3R | | | | | | | | | | | | | |
| -5 | | | | | | | | | | | | | | |
| -4 | | | | | | | | | | | | | | |
| -3 | | | | -0.296 | -0.207 | -0.138 | -0.065 | 0 | 0.069 | 0.138 | 0.207 | 0.296 | | |
| -2 | | | | -0.320 | -0.222 | -0.148 | -0.069 | 0 | 0.074 | 0.148 | 0.222 | 0.320 | | |
| -1 | | | | -0.348 | -0.240 | -0.160 | -0.074 | 0 | 0.080 | 0.160 | 0.240 | 0.348 | 0.400 | |
| 0 | | | | -0.381 | -0.261 | -0.174 | -0.080 | 0 | 0.087 | 0.174 | 0.261 | 0.381 | 0.435 | |
| 1 | | -0.571 | | -0.421 | -0.286 | -0.190 | -0.087 | 0 | 0.095 | 0.190 | 0.286 | 0.421 | 0.476 | 0.571 |
| 2 | | -0.632 | | -0.471 | -0.316 | -0.211 | -0.095 | 0 | 0.105 | 0.211 | 0.316 | 0.471 | 0.526 | 0.632 |
| 3 | | -0.706 | | -0.526 | -0.353 | -0.235 | -0.105 | 0 | 0.118 | 0.235 | 0.353 | 0.533 | 0.588 | 0.706 |
| 4 | | | | -0.588 | -0.400 | -0.267 | -0.118 | 0 | 0.133 | 0.267 | 0.400 | 0.615 | 0.667 | |
| 5 | | | | -0.667 | -0.462 | -0.308 | -0.133 | 0 | 0.154 | 0.308 | 0.462 | 0.727 | 0.769 | |
| 6 | | | | -0.769 | -0.545 | -0.364 | -0.154 | 0 | 0.182 | 0.364 | 0.545 | | | |
| | | | | | -0.667 | -0.444 | -0.182 | 0 | 0.222 | 0.444 | 0.667 | | | |
| | | | | | | -0.727 | -0.222 | 0 | 0.286 | | | | | |
| Y0=-6 | | -5 | -4 | -3 | -2 | -1 | 0 | 1 | 2 | 3 | 4 | 5 | 6 | |

FIG. 22D

| Y0=-6 | | -5 | -4 | -3 | -2 | -1 | 0 | 1 | 2 | 3 | 4 | 5 | 6 | |
|---|---|---|---|---|---|---|---|---|---|---|---|---|---|---|
| X0=-6 | B4θ/B4R | | | | | | 0.706 | 0.632 | 0.571 | | | | | |
| -5 | | | | | 0.769 | 0.667 | 0.588 | 0.526 | 0.476 | 0.400 | 0.296 | | 0.065 | |
| -4 | | 0.667 | 0.727 | | 0.615 | 0.533 | 0.471 | 0.421 | 0.381 | 0.320 | 0.222 | 0.207 | 0 | -0.065 |
| -3 | | 0.444 | 0.545 | | 0.462 | 0.400 | 0.353 | 0.316 | 0.286 | 0.240 | 0.148 | 0.138 | 0 | |
| -2 | | 0.222 | 0.364 | | 0.308 | 0.267 | 0.235 | 0.211 | 0.190 | 0.160 | 0.074 | 0.069 | 0 | |
| -1 | | 0 | 0.182 | | 0.154 | 0.133 | 0.118 | 0.105 | 0.095 | 0.080 | 0 | 0 | 0 | |
| 0 | | -0.222 | 0 | | 0 | 0 | 0 | 0 | 0 | 0 | -0.074 | -0.069 | 0 | |
| 1 | | -0.444 | -0.182 | | -0.154 | -0.133 | -0.118 | -0.105 | -0.095 | -0.080 | -0.148 | -0.138 | 0 | |
| 2 | | -0.667 | -0.364 | | -0.308 | -0.267 | -0.235 | -0.211 | -0.190 | -0.160 | -0.222 | -0.207 | | |
| 3 | | 0.286 | -0.545 | | -0.462 | -0.400 | -0.353 | -0.316 | -0.286 | -0.240 | -0.296 | | | |
| 4 | | 0 | -0.727 | | -0.615 | -0.533 | -0.471 | -0.421 | -0.381 | -0.320 | | | | |
| 5 | | -0.286 | | | -0.769 | -0.667 | -0.588 | -0.526 | -0.476 | -0.435 | | | | |
| 6 | | | | | | | -0.706 | -0.632 | -0.571 | | | | | |
| Y0=-6 | | -5 | -4 | -3 | -2 | -1 | 0 | 1 | 2 | 3 | 4 | 5 | 6 | |

| | X0=-6 | -5 | -4 | -3 | -2 | -1 | 0 | 1 | 2 | 3 | 4 | 5 | 6 | |
|---|---|---|---|---|---|---|---|---|---|---|---|---|---|---|
| Y0=-6 | $\chi_2^2$ | | | | | | | | | | | | | |
| -5 | | | | | | | 0.25 | 0.11 | 0.06 | | | | | |
| -4 | | | | | | 0.64 | 0.20 | 0.09 | 0.04 | 0.07 | 0.28 | | | |
| -3 | | | 1.71 | 1.54 | 0.92 | 0.52 | 0.20 | 0.10 | 0.08 | 0.07 | 0.13 | 0.24 | | |
| -2 | | 1.96 | 1.47 | 1.19 | 0.79 | 0.47 | 0.25 | 0.16 | 0.17 | 0.14 | 01.2 | 0.20 | | |
| -1 | | 1.78 | 1.40 | 1.08 | 0.75 | 0.49 | 0.34 | 0.26 | 0.31 | 0.27 | 0.24 | 0.30 | 0.38 | |
| 0 | | 1.79 | 1.46 | 1.07 | 0.79 | 0.57 | 0.47 | 0.40 | 0.50 | 0.47 | 0.48 | 0.54 | 0.64 | |
| 1 | | 1.97 | 1.63 | 1.16 | 0.90 | 0.69 | 0.65 | 0.58 | 0.75 | 0.73 | 0.85 | 0.90 | 1.11 | |
| 2 | | 2.32 | 1.92 | 1.33 | 1.08 | 0.87 | 0.87 | 0.80 | 1.04 | 1.06 | 1.33 | 1.40 | | |
| 3 | | 2.83 | 2.33 | 1.59 | 1.32 | 1.10 | 1.13 | 1.07 | 1.39 | 1.45 | 1.95 | 2.04 | | |
| 4 | 2.17 | 3.52 | 2.87 | 1.93 | 1.62 | 1.37 | 1.43 | 1.37 | 1.79 | 1.91 | 2.71 | | | |
| 5 | 2.36 | | 3.56 | 2.37 | 1.99 | 1.70 | 1.78 | 1.71 | 2.25 | | | | | |
| 6 | 2.79 | | | 2.91 | 2.43 | 2.09 | 2.18 | 2.10 | | | | | | |
| | | | | | 2.98 | 2.54 | 2.61 | 2.53 | | | | | | |
| | | | | | | 3.06 | | | | | | | | |
| Y0=-6 | | -5 | -4 | -3 | -2 | -1 | 0 | 1 | 2 | 3 | 4 | 5 | 6 | |

*FIG. 23*

MAGNETIC DETECTION OF DRILL PIPE CONNECTIONS

CROSS REFERENCE TO RELATED APPLICATIONS

None.

FIELD OF THE INVENTION

Disclosed embodiments relate generally to drilling risers used in offshore drilling operations and more particularly to an apparatus and method for magnetic detection of drill pipe joints (connections) deployed in a drilling riser.

BACKGROUND INFORMATION

Offshore drilling rigs may operate at water depths exceeding 10,000 feet. When operating with a floating drilling unit (such as a drill ship or a semisubmersible drilling rig), the blowout preventers (BOPS) are generally located on the seafloor (rather than on the rig). The region between the BOP and the drilling rig is bridged by a series of large diameter tubes that are mechanically coupled to one another and make up the drilling riser. During a drilling operation the drill string is deployed in the drilling riser, with drilling fluid occupying the annular region between the drill string and the riser wall.

In a well control situation, formation fluids and/or gas can enter the well bore and may potentially result in a blowout if not properly controlled. The BOP commonly employs one or more mechanisms for sealing the drill pipe in the event of formation fluid ingress. For example, pipe-rams may be used to seal against the drill-pipe. Some pipe-rams may preferably seal against the tubular section of the drill-pipe or are only able to seal against the tubular section of the drill-pipe, as they are specialized for such diameter.

In severe cases, in which sealing the drill pipe is inadequate, the final defense against a blowout may be to sever the drill pipe with a shear ream such as a blind shear ram (BSR) or a casing shear ram (CSR). These rams employ steel blades driven by hydraulic pistons to cut through the drill pipe and seal off the BOP bore. The rams and pistons are suitably strong to shear the tubular section of the drill pipe, but are not generally capable of shearing the drill pipe connections (located between the tubular sections) due to the significantly increased wall thickness of the connection. Thus, in the event that the drill pipe connection is located in the BSR or CSR, the drill pipe cannot be cut and the well cannot be properly sealed. There is therefore a need in the art for a method and apparatus capable of locating the drill pipe connections (also referred to herein as drill pipe joints) with respect to the BSR and CSR in a subsurface BOP.

SUMMARY

A system for determining a location of a drill pipe joint deployed in a bore is disclosed. The system includes a drill string deployed in a bore with the drill string including a drill pipe joint at which first and second drill pipes are connected to one another. At least one magnetometer is deployed on the bore. A processor is in electronic communication with the magnetometer and is configured to process magnetic field measurements made by the magnetometer to determine at least one of an axial position and a lateral position of the drill pipe joint. Methods for determining axial and lateral positions of the drill pipe joint are also disclosed.

The disclosed embodiments may provide various technical advantages. For example, disclosed embodiments provide a system for detecting drill pipe joints in a drilling riser near the BOP or in the subsea stack. The system may be further configured to determine drill pipe eccentricity. Disclosed system embodiments may therefore improve operational safety during a kick by locating drill pipe joints relative to the BOP blind shear rams and by determining eccentricity of drill pipe joints.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 2 depicts one of the riser sections deployed in the drilling riser shown on FIG. 1.

FIG. 3 depicts a cross-sectional view of the riser section shown on FIG. 2.

FIGS. 19A-B depict longitudinal and circular cross sections of a double studded adapter employing a plurality of circumferentially spaced magnetometers.

FIG. 19C depicts a block diagram of an example electronic circuit.

FIGS. 22A, 22B, 22C, and 22D depict tables that list modelled tangential to radial magnetic field ratios $B_{1\theta}/B_{1R}$ (22A), $B_{2\theta}/B_{2R}$ (22B), $B_{3\theta}/B_{3R}$ (22C), and $B_{4\theta}/B_{4R}$ (22D) versus the lateral position of a drill pipe joint ($X_0$ and $Y_0$) for one illustrative example (see Example 2).

FIG. 23 depicts a table that lists values of the computed quantity $\chi_2^2$ at each lateral position ($X_0$ and $Y_0$) listed in the tables depicted on FIGS. 22A-22D.

DETAILED DESCRIPTION

Figure 1:
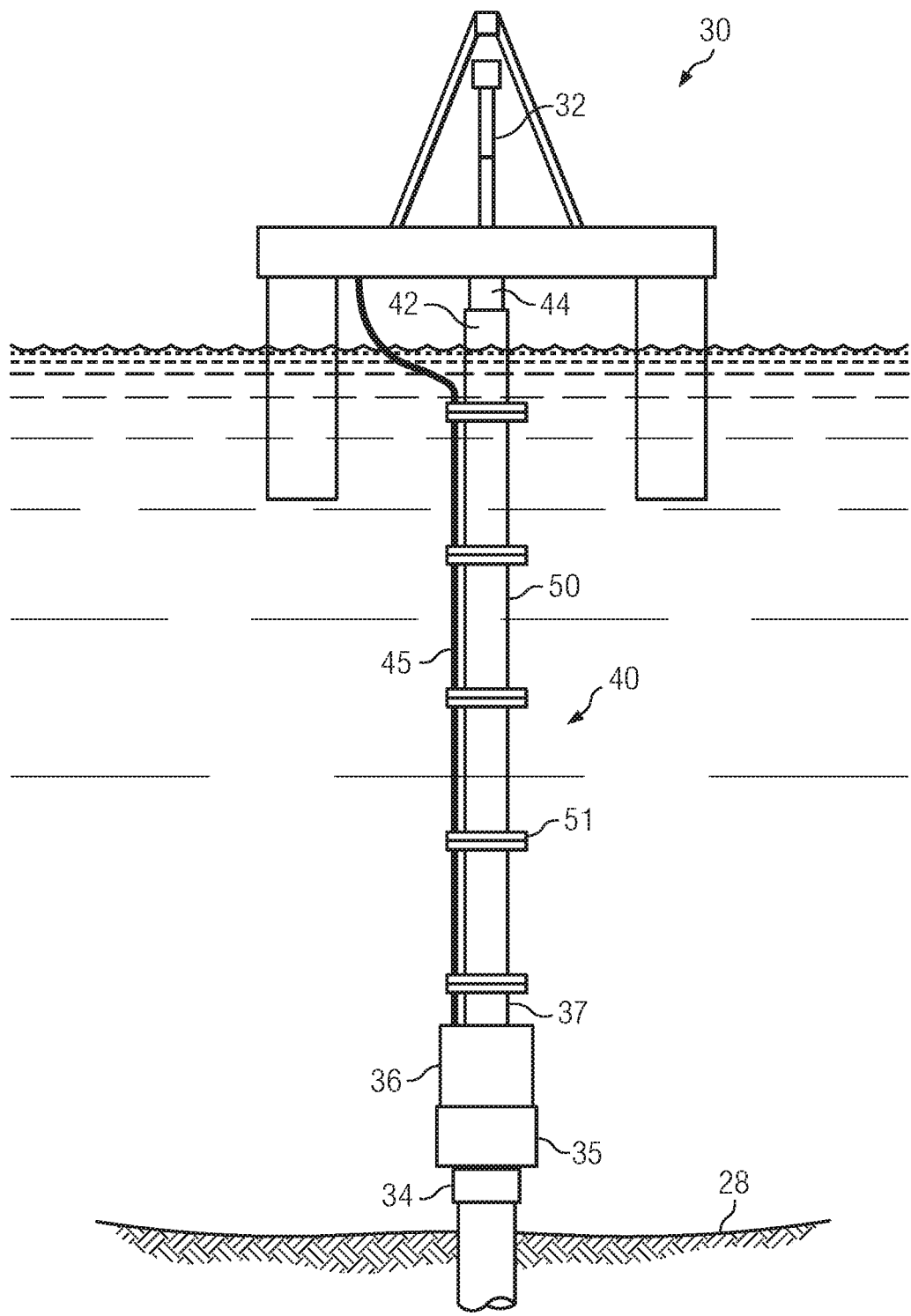
FIG. 1 depicts a floating offshore drilling rig employing a prior art drilling riser.

FIG. 1 depicts a floating offshore drilling rig 30 employing a prior art drilling riser 40. During a conventional drilling operation, drilling fluid (commonly referred to in the industry as "mud") is pumped downhole through a drill pipe 32 and various drilling tools before flowing out through jets mounted in the drill bit (not shown). In the region of the wellbore located below the sea floor 28, the mud carries cuttings back to the drilling rig in the annular space between the drill pipe and the borehole or casing. In the region between the sea floor 28 and the drilling rig 30, the drill string (and therefore the mud and cuttings) are contained in the drilling riser 40. The well-head 34 is connected to the top of the well via one casing. A blow out preventer (BOP) 35 is connected to the well-head 34. The drilling riser is coupled to the (BOP) 35 via a lower marine riser package (LMRP) 36 and a lower flex joint 37, which allows the drilling riser to be tilted at a small angle (if necessary). The drilling riser 40 is generally connected to the drilling rig 30 (e.g., a floating rig) via a telescoping riser slip joint 42 configured to accommodate heave and tide. The drilling riser 40 is generally maintained under tension to provide a mostly straight and vertical alignment (referred to in the art as a top tensioned riser). An upper flex joint 44 allows the slip joint 42 to be offset slightly from vertical. Drifting off location can also increase the tension on the riser to the point where the tensioner is locked out. A kill line 45 may connect the rig to the LMRP 36 and/or to BOP 35. Choke, boost, and hydraulic lines (not shown) may further connect the BOP to the rig.

Those of ordinary skill in the art will understand that the drilling riser 40 is substantially vertical, but that small angle deviations (e.g., on the order of one or two degrees) can often be tolerated. Further deviation may damage the LMRP 36, the BOP 35, and/or the riser slip joint 42. The drilling riser 40 is commonly made up of a large number of coupled riser sections 50 (e.g., clamped or bolted to one another as shown at 51).

FIG. 2 depicts one of the prior art riser sections 50 deployed in the riser shown on FIG. 1. Individual riser sections are commonly very large and heavy. For example, each riser section 50 may be up to about 90 feet long, such that a water depth of 10,000 feet can require over 100 riser sections 50. A large central tube 52 (also referred to as the riser tube) receives the drill string 32 (FIG. 1) and the return flow of drilling mud. The central tube 52 generally has a diameter significantly greater than that of the drill pipe, for example, a 21 inch outer diameter and a 19.5 inch inner diameter. Prior art riser sections 50 commonly include flanges 54 located at their axial ends for connecting to one another (such as via bolts 55). Alternatively, some riser sections may use a clamping system including numerous "dogs" to lock the riser sections together. The riser sections 50 commonly further include a number of smaller high pressure auxiliary tubes 56 (e.g., three in the depiction) rigidly connected to the flanges. These auxiliary tubes 56 may include kill, choke, and boost lines and generally have a diameter in a range from about two to six inches. The auxiliary tubes 56 connect the drilling rig 30 to the BOP 35 and LMRP 36. These rigid auxiliary tubes 56 commonly end below the riser slip joint 42 (FIG. 1) and may be connected to the rig via flexible lines.

FIG. 3 depicts a cross-sectional view of the riser section 50 shown on FIG. 2. During make-up of a riser string (the drilling riser 40), the riser sections 50 that have already been made-up may be suspended below the rig floor (e.g., in the sea), with the box end 58 of the central tube 52 facing upwards. The next riser section 50 is brought up in the derrick with the pin end of the central tube 52 facing downwards. Upon alignment of the box and pin ends of the riser tube (as well as the box and pin ends of the auxiliary tubes), the upper riser section is lowered until fully engaged with the made up string. The flanges 54 may then be bolted together. The presence of the lines 56 does not interfere with assembling or disassembling, and hence does not generally add to the tripping time. Since three or more auxiliary lines are commonly employed, mechanical alignment of these tubes is critical thereby requiring very tight manufacturing tolerances.

Commonly assigned and commonly invented U.S. Provisional Patent Application Ser. No. 62/242,091, which is incorporated by reference herein in its entirety, discloses an intelligent riser that includes a high speed two-way communication system employing inductive couplers at each of the flange couplings. The intelligent riser may further include a plurality of sensors distributed axially along the length of the riser. The communication system may provide electronic communication between the sensors and a surface electronics module located on the rig. In the embodiments disclosed herein an intelligent riser may provide electronic communication between various magnetometers deployed at a lower end of the riser and the drilling platform.

Figure 4:
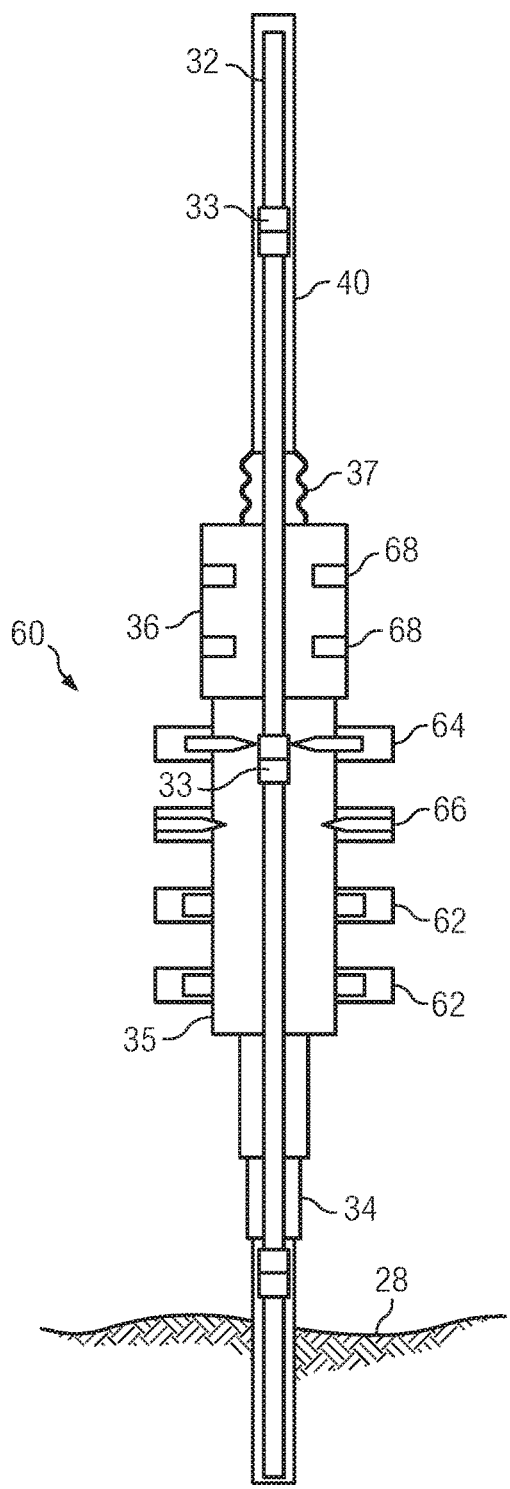
FIG. 4 depicts drill pipe deployed in a subsea stack and riser section.

FIG. 4 depicts drill pipe 32 inside subsea stack 60. As described above with respect to FIG. 1, the subsea stack 60 may include a LMRP 36 and a BOP 35 deployed above wellhead 34 and below flex joint 37. In the depicted embodiment, BOP 35 may include one or more variable bore rams (VBR) 62 configured to seal around the drill pipe. The BOP 35 may further include a blind shear ram (BSR) 64 and/or a casing shear ram (CSR) 66 configured to shear the drill pipe 32. The drill pipe 32 includes conventional tubulars 32 coupled together via connections 33 (also referred to in the art as tool joints or drill pipe joints) as described in more detail below.

In a well control situation, formation fluids and/or gas can enter the well bore and may potentially result in a blowout if not controlled. The BOP 35 is configured to prevent a blowout from occurring. For example, in the event of an influx of formation fluid into the well, the first defense is generally to close the annular preventer(s) 68 in the LMRP 36 or BOP 35 which is intended to seal the outside of the drill pipe. If the annular preventer 68 sets properly, then the driller can open the choke line and bleed off the pressure while injecting heavy mud through the kill line.

The variable bore rams 62 in the BOP 35 may also be used to seal around the drill pipe 32. It is generally preferable to close the VBR 62 on the tubular section 32 of the drill-pipe 32, and not on the connecter 33 (the "tool-joint"), as the cylindrical surface is longer and smoother.

In the event that sealing the drill pipe fails, the final defense against a blowout is commonly to sever the drill pipe with the BSR 64 or the CSR 66. The BSR and CSR include strong steel blades driven by hydraulic pistons and are thus configured to cut through the drill pipe and seal off the well. While the BSR 64 and CSR 66 are configured to shear the tubular section, they are not generally capable of shearing the pipe connection 33 as the wall thickness of the connection 33 is generally several times greater than that of the tubular 32. For example, for a conventional 5⅞ inch pipe the tubular wall thickness is about 0.181 inch versus a wall thickness of 1.240 inches for a corresponding XT57 connection. Thus, if the drill pipe connection 33 is located in the BSR or CSR, then the drill pipe cannot generally be sheared and the well cannot be sealed.

In response to an influx of formation fluids (a "kick"), a driller commonly attempts to "space" the drill pipe so that the drill pipe connection is not located in the BSR or CSR. The driller may then close an annular preventer or a VBR. However, the exact location of the drill pipe connections in the vicinity of the BOP may not be known with high enough accuracy. Furthermore, the drill pipe may be moving up and down due to the heave affecting the floating platform (e.g., such a situation may occur when the rig heave compensation for the drill string is not activated). While the driller maintains a "tally" that lists the position of each section of drill pipe and its length, the length of the drill string can vary. For example, drill pipe lengths vary slightly. In a deepwater well, there may be as much as 10,000 feet of drill pipe between the mobile offshore drilling unit (MODU) and the BOP. Such a depth requires 312 sections of 32 foot long drill pipe just to reach the seafloor. A systematic error of only 0.1 inch per length of drill pipe accumulates to over 30 inches of error. Moreover, there are other potential sources of error, such as heave and tide effect on the MODU, thermal expansion/contraction of the drill pipe, pipe stretch under tension, stretch of the cable between the draw-works and the travelling block, and drill pipe buoyancy in heavy muds. Another potential source of error is the measurement of hook height above the rig floor (which can vary).

One known approach to locating the drill pipe joints involves partially closing the variable bore ram such that the smaller diameter drill pipe tubulars slide freely through it, but the larger diameter drill pipe joints do not. The resulting slight increase in drill string tension may indicate the joint is in the annular preventer. However, this is a difficult measurement with potential error.

Furthermore, it should be noted that when the drill string is not on bottom, most drill string tension meters are typically fully extended such that the drill string moves up and down with the vertical movement of the MODU imposed by the heave. In the case of large heave, this movement may be 15 feet or more, while the period of the heave movement can be as short as 15 seconds. Under these circumstances, the conventional determination of the presence of a drill pipe connection can be exceedingly problematic.

Additionally, high pressure oil and gas in a kick can force the drill string towards the surface. For example, in the 2010 Macondo blowout, the BOP was moved towards the surface such that even an extremely accurate depth system would not have been able to locate the position of the drill pipe connections with respect to the BSR.

With continued reference to FIG. 4, a drill pipe connection 33 is depicted as being located in the BSR 64. Given the uncertainty in the exact position of connections 33, the driller may be forced to guess or "take a chance" that the thin walled tubular section is in the BSR 64. For the above described 5⅞ inch pipe employing XT57 connections, the likelihood of the connection randomly being in the BSR is about 7.6% (the connection is about 29 inches in length as compared to a tubular length of 32 feet). Although this is a small percentage, the consequences of trying to cut through a drill pipe connection are severe (e.g., a blowout). Given the difficulties in locating the connections, some jurisdictions require that the BOP have two distinct and spaced apart sets of blind shear rams such that one is always adjacent to the thin walled tubular. However, some existing BOPs cannot be upgraded to include two BSR sets.

Moreover, when closing the pipe-rams, it may be important for the drill-sting to be sufficiently close to the center of the BOP such that the "slots" of the rams can engage the drill string. One common method for centralizing the tubular is to close the annular preventer to push the drill string towards the center of the riser tube. A sensing method capable of verifying the position of the center of the tubular in relation with the bore of the BOP or riser components may be advantageous.

Magnetic Sensor Embodiments

Figure 5:
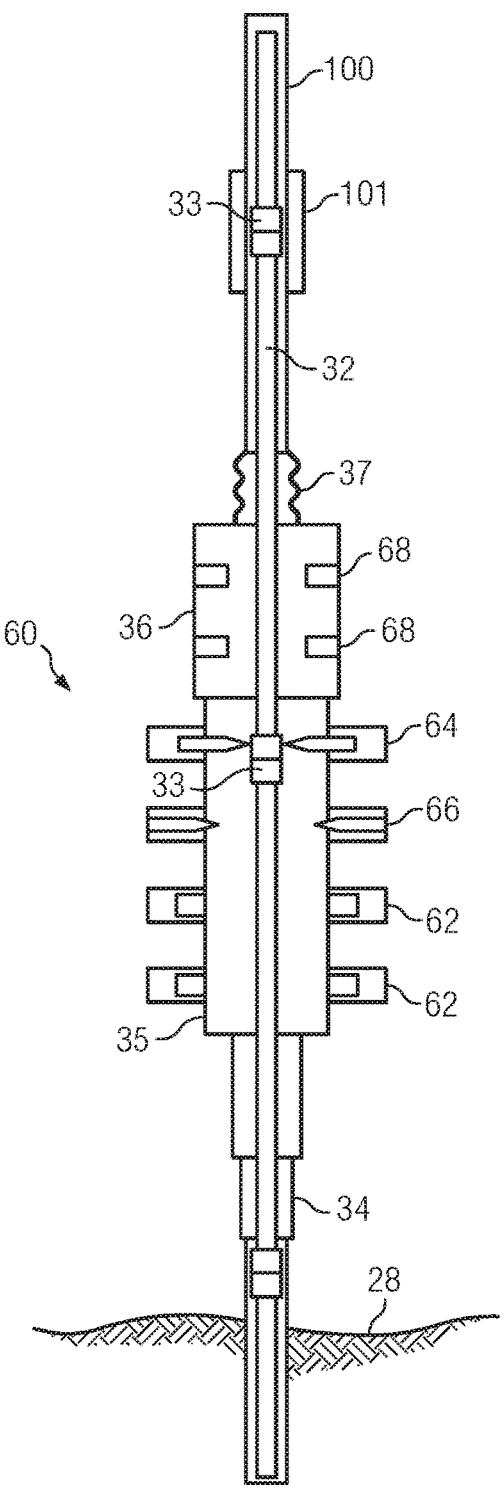
FIG. 5 depicts a subsea stack with one embodiment of drilling riser including a magnetic sensor arrangement.

One aspect of the disclosed embodiments is the realization that the drill pipe connection may be detected using magnetic sensors in the vicinity of the BOP 35, e.g., in the subsea stack 60 or in the drilling riser above the BOP 35. Such sensors may be spaced apart from the BOP, for example, by one or more pipe lengths away from the BSR or CSR. FIG. 5 depicts one embodiment of drilling riser 100 including a magnetic sensor arrangement (which is depicted schematically at 101). In the depicted embodiment, the sensor arrangement 101 is deployed above the subsea stack 60 in the lowermost riser section just above the BOP 35 (e.g., an integer number of pipe lengths above the BSR 64—one pipe length in the depicted example). As described in more detail below the sensors in arrangement 101 are configured to measure magnetic fields associated with the drill pipe and thus determine whether or not a drill pipe joint is located adjacent to the sensors. The sensors 101 may also be configured to determine the axial and lateral positions of the joint in relation to the center of the drilling riser. In the event of a kick, the drilling operator may determine whether or not a drill pipe joint 33 is located adjacent the sensors 101 and if necessary move the drill string in an axial direction such that the joint is no longer in the vicinity of the sensors 101.

In an alternative embodiment, the magnetic sensor(s) may be located a known distance above the BSR (e.g., from about one-quarter to about three quarters of a drill pipe length above the BSR). In such an embodiment, the drilling operator may elect to move the drill string such that the joint 33 is detected adjacent to the magnetic sensors. The position of the drill pipe joint relative to the BSR is then known and ensures that the smaller diameter tubular is located adjacent to the BSR (or CSR).

With continued reference to FIG. 5, it will be understood that the disclosed embodiments are not limited merely to drilling riser embodiments or even to downhole embodiments. For example, the measurement may be adapted to the LMRP or BOP. The disclosed embodiments may be directed to substantially any system in which a magnetic pipe is deployed in a bore and in which one or more magnetic sensors are deployed in the wall of the bore. Moreover, while the embodiments described below with respect to FIG. 6 and following are described with respect to an example drilling riser system, they may also be understood to depict and described a more generic system involving a pipe deployed in a bore.

Figure 6:
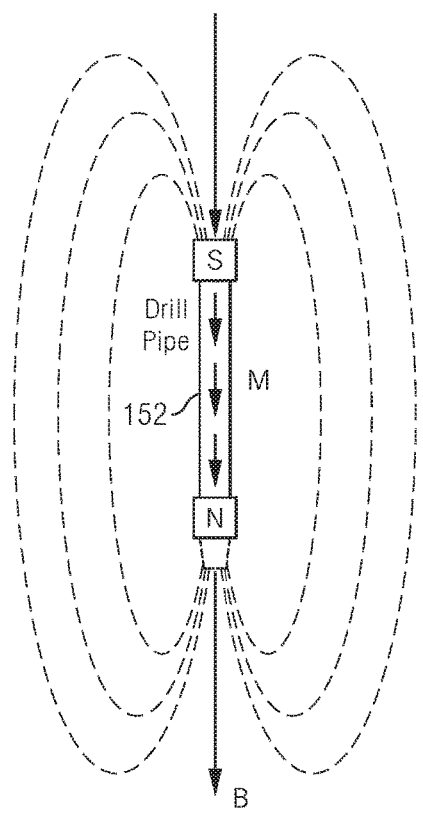
FIG. 6 depicts a steel drill pipe having a permanent magnetization.

FIG. 6 depicts a steel drill pipe 152 having a permanent magnetization. Conventional steel drill pipes are known to be magnetic and often acquire a permanent magnetization $\vec{M}$, which may be thought of as the number of atoms with aligned magnetic dipole moments per unit volume of the pipe. Such magnetization may occur naturally, for example, from the Earth's magnetic field or from being exposed to other magnetic fields (e.g., during magnetic inspection techniques). A single drill pipe tends to be magnetized with a north pole N at one end and a south pole S at the other end. In the depicted embodiment the north pole N is shown at the pin end and the south pole S is shown at the box end, although the opposite polarity may occur with equal frequency. A surface magnetic charge can be defined by $\sigma_m = \vec{M} \cdot \hat{n}$ where $\hat{n}$ is normal to the surface of the drill pipe. As the magnetic field lines tend to emerge primarily from the box and pin ends (as depicted), the surface magnetic charge tends to be concentrated at these ends. In the depicted embodiment, the magnetic surface charge is positive at the north pole $\sigma_m = M$, and negative at the south pole $\sigma_m = -M$. The net magnetic charge at the north pole is $P = \mu_0 \sigma_m A$, where A is the effective area and $\mu_0 = 4\pi \cdot 10^{-7}$ Henry/m. The net magnetic charge at the south pole is $-P$. It will be understood that these magnetic charges are a mathematical construction as individual magnetic charges (monopoles) do not exist in reality. However, the external magnetic field $\vec{B}$ may be modelled as though induced by magnetic monopoles $P$ and $-P$. The disclosed embodiments are set forth using magnetic pole theory, which will be understood to be an approximation. More precise calculations may be performed using various mathematical techniques known to those of ordinary skill in the art.

The total magnetic field from adjacent monopoles may be expressed mathematically, for example, as follows:

$$\vec{B} = \vec{B}_1 + \vec{B}_2 = \frac{P}{4\pi r_1^2}\hat{r}_1 - \frac{P}{4\pi r_2^2}\hat{r}_2 \quad (1)$$

where $\hat{r}_1$ represents a unit vector pointing from the north pole to the observation point and $r_1$ represents the corresponding distance, $\hat{r}_2$ represents a unit vector pointing from the south pole to the observation point and $r_2$ represents the corresponding distance. In one consistent system of units, the magnetic field $\vec{B}$ is in Tesla, the magnetic charge P is in Webers (Wb), and the distances $r_1$ and $r_2$ are in meters.

Figure 7:
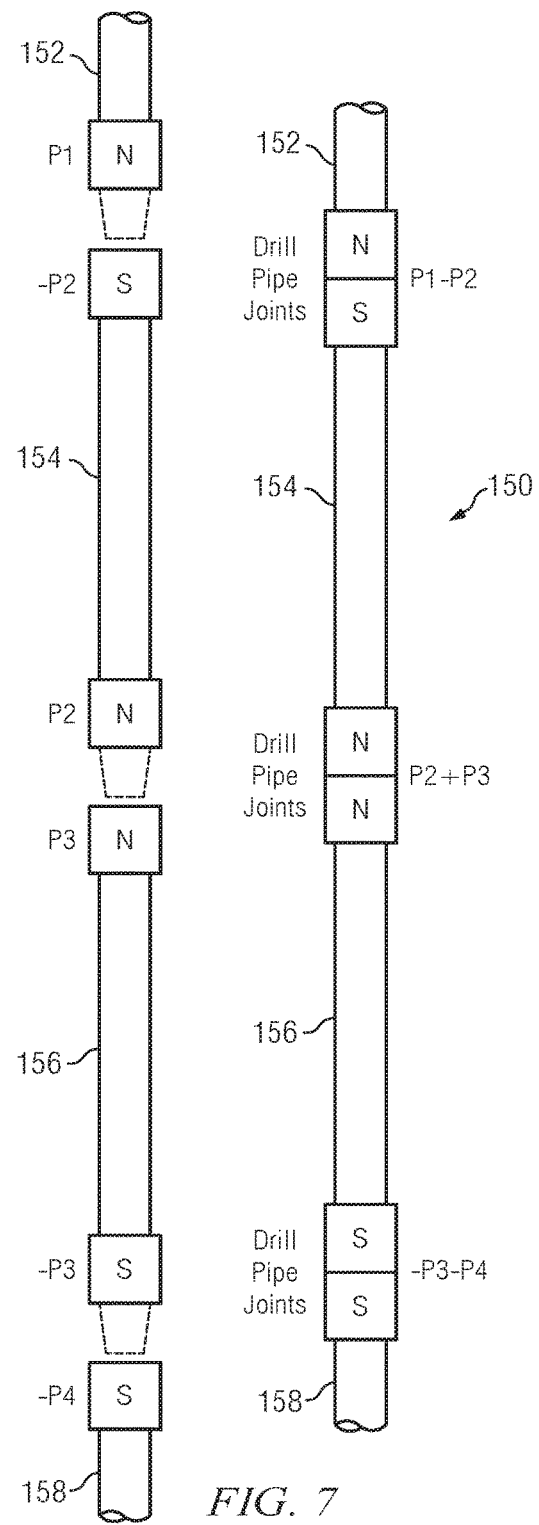
FIG. 7 depicts a drill string including a plurality of randomly magnetized drill pipes connected end to end in a drill string.

FIG. 7 depicts a plurality of randomly magnetized drill pipes 152, 154, 156, 158 connected end to end in a drill string 150. The north and south poles are indicated along with the individual pole strengths, $P_1$, $-P_2$, $P_2$, $P_3$, $-P_3$, and $-P_4$. After assembly, the pole strengths add to give: $P_1-P_2$, $P_2+P_3$, and $-P_3-P_4$ at the joints. The corresponding magnetic field at any location may be expressed mathematically, for example, as follows:

$$\vec{B} = \sum_i \frac{P_i}{4\pi r_i^2}\hat{r}_i \quad (2)$$

where the subscript i indicates the drill pipe joint number such that $P_i$ represent the pole strengths of the corresponding joints.

Figure 8A:
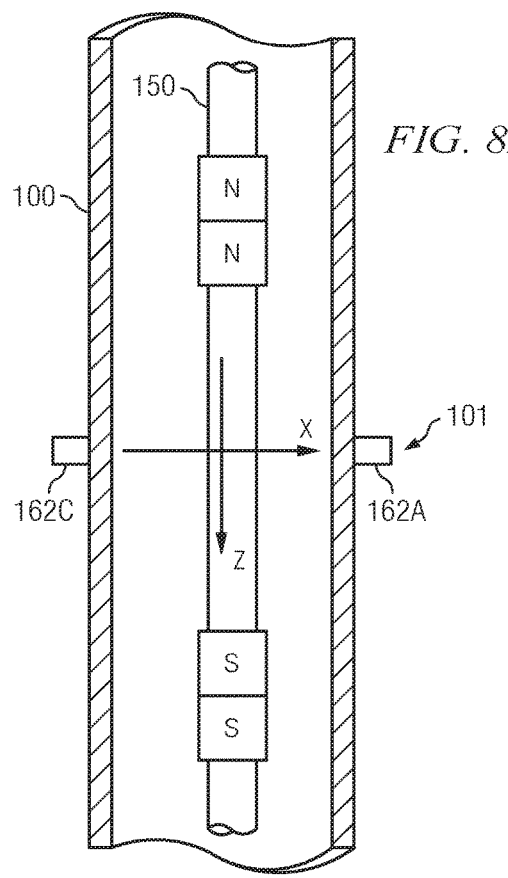
FIGS. 8A and 8B depict longitudinal (8A) and radial (8B) views of the drill string shown on FIG. 7 deployed in a riser section.
Figure 8B:
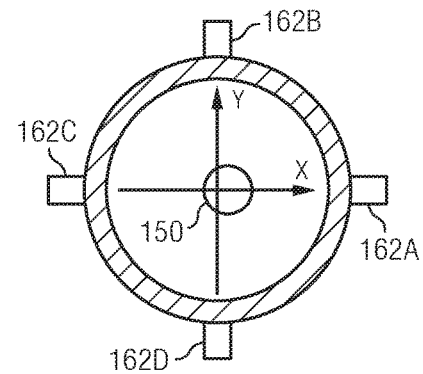

FIGS. 8A and 8B depict drill string 150 deployed in a riser section 100. The drill string 150 may be centered or eccentered inside the riser (the disclosed embodiments are not limited in this regard). In the depicted embodiment, drilling riser 100 includes a magnetic sensor set 101 having four (first, second, third, and fourth) co-planar, three-axis (triaxial) magnetometers 162A, 162B, 162C, 162D located at the z=0 plane at 90 degree intervals around the circumference. It will be understood that the disclosed embodiments are, of course, not limited to the depicted embodiment and that substantially any number of magnetometers may be utilized at substantially any suitable circumferential spacing (equal or non-equal) about the riser section.

In certain advantageous embodiments, the riser section 100 upon which the magnetometers are deployed may be fabricated from conventional nonmagnetic steel (although the disclosed embodiments are not limited in this regard). In such embodiments, the magnetic field emanating from the drill string 150 tends to penetrate the riser section unaffected. While the magnetometers are shown deployed on an outer surface of the riser section 100, they may also be deployed in the riser wall.

Figure 9:
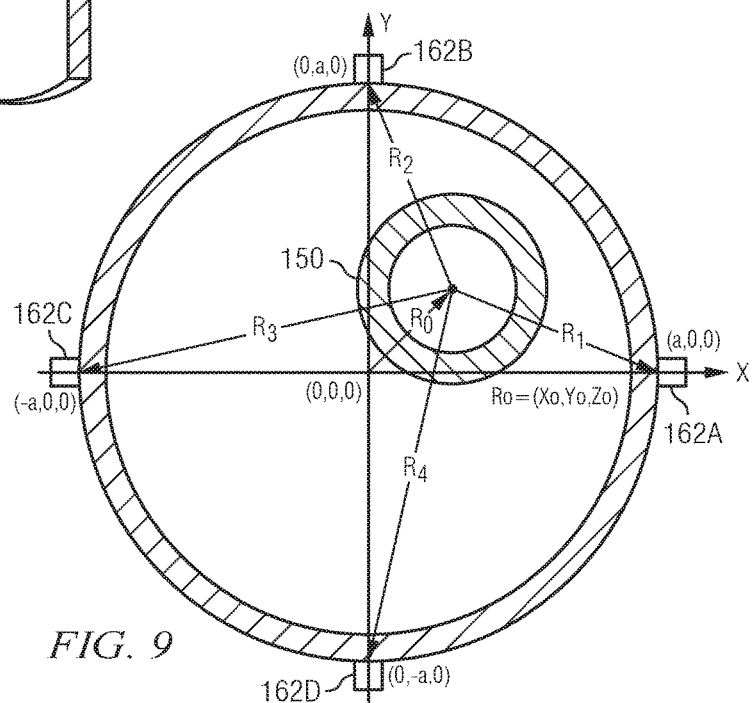
FIG. 9 depicts a circular cross section of an eccentered drill string deployed in a riser section including first, second, third, and fourth triaxial magnetometers.

FIG. 9 depicts a circular cross section of an eccentered drill string 150 deployed in riser section 100 (including first, second, third, and fourth triaxial magnetometers 162A, 162B, 162C, and 162D). The magnetometers 162A-D are deployed such that the z-axis magnetic field sensor of each triaxial magnetometer is aligned with the drilling riser axis, while the x- and y-axis sensors are perpendicular to the drilling riser axis. In one common riser embodiment, the drilling riser has a 19 inch ID and a 20.5 inch OD (2·a). The center of the riser in the plane of the magnetometers may be defined as being the origin (0,0,0) of a three-dimensional Cartesian coordinate system. The magnetometers 162A, 162B, 162C, and 162D are located at (a, 0,0), (0, a, 0), (-a, 0,0), and (0, -a, 0) respectively. The center of the drill pipe joint is $\vec{R}_0 = (X_0, Y_0, Z_0)$. As is known to those of ordinary skill, one commonly utilized drill pipe has a diameter of 5⅞ inch with a 7 inch OD tool joint.

Vectors from the center of the drill pipe joint to each of the magnetometers 162A, 162B, 162C, and 162D may be defined, for example, as follows: $\vec{R}_1 = a\hat{x} - \vec{R}_0$, $\vec{R}_2 = a\hat{y} - \vec{R}_0$, $\vec{R}_3 = -a\hat{x} - \vec{R}_0$, and $\vec{R}_4 = -a\hat{y} - \vec{R}_0$ where $\hat{x}$ and $\hat{y}$ represent unit vectors along the x- and y-axes. The vector magnitudes may be expressed, for example, as follows:

$$R_1 = \sqrt{(X_0-a)^2 + Y_0^2 + Z_0^2};$$

$$R_2 = \sqrt{X_0^2 + (Y_0-a)^2 + Z_0^2};$$

$$R_3 = \sqrt{(X_0+a)^2 + Y_0^2 + Z_0^2};$$

$$R_4 = \sqrt{X_0^2 + (Y_0+a)^2 + Z_0^2} \quad (3)$$

A magnetic monopole having strength P and located at $\vec{R}_0 = (X_0, Y_0, Z_0)$ may be used to calculate the magnetic field at each of the four magnetometers depicted on FIG. 9. Given that the magnetic field for a monopole varies as $1/r^2$, it may be sufficient to consider only the contribution of the drill pipe joint located closest to the z=0 plane. The magnetic fields at each of the magnetometers (from a single joint) may be expressed mathematically, for example, as follows (where i=1, 2, 3, 4 represents the magnetometers 162A, 162B, 162C, and 162D respectively):

$$\vec{B}_i = \frac{P\vec{R}_i}{4\pi R_i^3} \quad (4)$$

The magnetic field at each magnetometer (in the FIG. 9 embodiment) may be further expressed in Cartesian and cylindrical coordinates, for example, as follows:

$$\vec{B}_1 = B_{1X}\hat{x} + B_{1Y}\hat{y} + B_{1Z}\hat{z} = \quad (5)$$
$$-\frac{P}{4\pi R_1^3}[(X_0 - a)\hat{x} + Y_0\hat{y} + Z_0\hat{z}] = B_{1R}\hat{r} + B_{1\theta}\hat{\theta} + B_{1Z}\hat{z};$$

$$\vec{B}_2 = B_{2X}\hat{x} + B_{2Y}\hat{y} + B_{2Z}\hat{z} =$$
$$-\frac{P}{4\pi R_2^3}[X_0\hat{x} + (Y_0 - a)\hat{y} + Z_0\hat{z}] = B_{2R}\hat{r} + B_{2\theta}\hat{\theta} + B_{2Z}\hat{z};$$

$$\vec{B}_3 = B_{3X}\hat{x} + B_{3Y}\hat{y} + B_{3Z}\hat{z} =$$
$$-\frac{P}{4\pi R_3^3}[(X_0 - a)\hat{x} + Y_0\hat{y} + Z_0\hat{z}] = B_{3R}\hat{r} + B_{3\theta}\hat{\theta} + B_{3Z}\hat{z};$$

$$\vec{B}_4 = B_{4X}\hat{x} + B_{4Y}\hat{y} + B_{4Z}\hat{z} =$$
$$-\frac{P}{4\pi R_4^3}[X_0\hat{x} + (Y_0 - a)\hat{y} + Z_0\hat{z}] = B_{4R}\hat{r} + B_{4\theta}\hat{\theta} + B_{4Z}\hat{z}$$

The triaxial magnetometers measure the components $B_{iX}$, $B_{iY}$, and $B_{iZ}$ (for i=1, 2, 3, 4 in the FIG. 9 embodiment) or equivalently $B_{iR}$, $B_{i\theta}$, and $B_{iZ}$ in cylindrical coordinates. In the embodiment depicted on FIG. 9, the cylindrical and Cartesian coordinates are related as follows: $B_{1R}=B_{1X}$, $B_{2R}=B_{2Y}$, $B_{3R}=-B_{3X}$, $B_{4R}=-B_{4Y}$, $B_{1\theta}=B_{1Y}$, $B_{2\theta}=-B_{2X}$, $B_{3\theta}=-B_{3Y}$, and $B_{4\theta}=B_{4X}$. It will be understood that the above set of equations for $\vec{B}_1$, $\vec{B}_2$, $\vec{B}_3$, and $\vec{B}_4$ may be utilized to compute the three-dimensional location of the magnetic pole and hence the position of the drill pipe joint.

Figure 10:
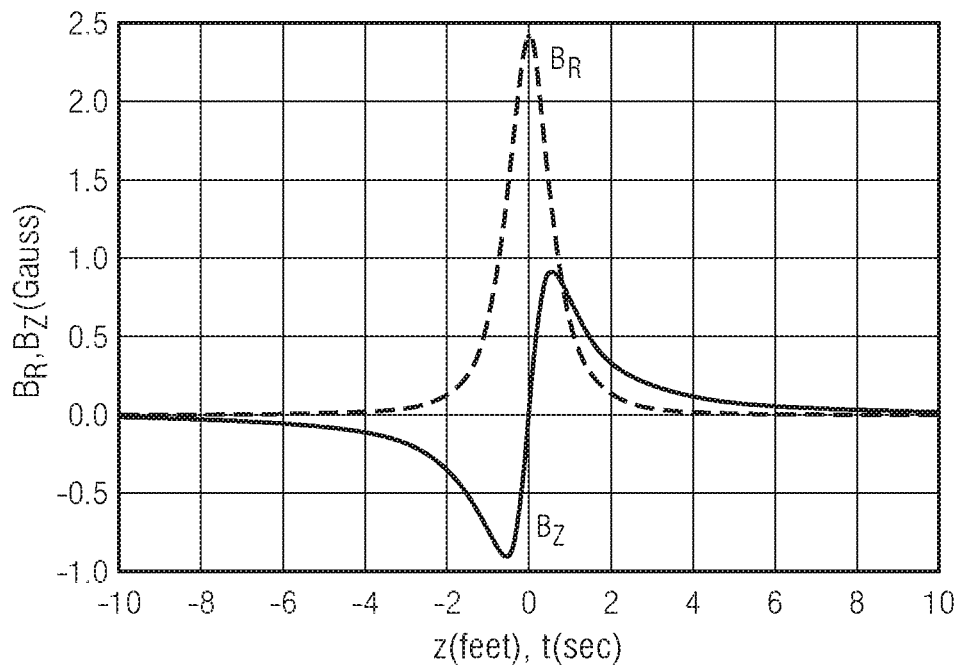
FIG. 10 depicts a plot of axial and radial magnetic field strength versus the axial location of a drill pipe joint for a centered drill string.

In embodiments in which the drill string is located at (or very near) the center of the drill riser (such that $X_0$ and $Y_0$ are approximately equal to zero), the magnetic field measurements made by each of the magnetometers are substantially equal owing to symmetry. For example, FIG. 10 depicts a plot of the magnetic field strength as the drill pipe joint moves along the riser axis (the z-axis). In the depicted example, the drill pipe joint is represented by a magnetic pole P=155 μWb, the magnetic field strength is plotted in units of Gauss versus the location of the joint along the z-axis in units of feet. As depicted, the radial magnetic field strength $B_R$ has a maximum value when the joint is located at the z=0 plane. The axial magnetic field strength $B_Z$ has a zero crossing at the z=0 plane, reaching maximum and minimum values on either side of the zero crossing. Note also that the magnetic fields decrease sharply with distance from the z=0 plane such that the location of the joint may be determined with suitable precision and such that there is minimal joint to joint interference. The azimuthal magnetic field strength $B_\theta$ is uniformly zero.

It will be understood that in a drilling operation the magnetic field measurements are made sequentially as a function of time. When the drill string moves along the axis at a constant (or near constant) velocity, a plot of magnetic field strength versus time may be similar to the plot depicted on FIG. 10. Thus, the horizontal axis in FIG. 10 may also be understood to be in units of time (e.g., seconds or minutes) with the plotted curves being functions of time: $B_R(t)$ and $B_Z(t)$. For example, during tripping the velocity of the drilling string may be about 1 foot per second. For all such plots a velocity of 1 foot per second is assumed. During drilling the velocity is generally much lower, for example, in a range from about 1 to about 3 feet per minute, however, axial vibrations and rig heave may cause more rapid movement of the drill string. In either case a magnetometer sampling rate on the order of about 1-100 Hz may provide suitable temporal resolution (depending on the operation).

With continued reference to FIGS. 8-10, it will be understood that the disclosed magnetic sensor embodiments are not limited to the use of four (or any other number) of magnetometers or to any particular spacing about the circumference of the drilling riser. For example, based on FIG. 10 it will be appreciated that a single magnetometer (even a single one axis magnetometer) may be sufficient to detect and determine the location of a drill pipe joint (the connection between two drill pipes is referred to herein as a "drill pipe joint" for simplicity). A combination of multiple measurements (via corresponding magnetometers, uniaxial, biaxial, or triaxial) may also be utilized, for example, to improve signal to noise ratio or provide measurement redundancy. The use of a plurality of multi-axial magnetometers may also enable the lateral position of an eccentered drill pipe joint to be determined as described in more detail below. In certain embodiments the use of at least three magnetometers (e.g., four, five, six, or more) having a circumferential spacing of less than or equal to 120 degrees (e.g., 90, 72, 60, or less) may be desirable. Moreover, the disclosed embodiments are also not limited to having an equal circumferential spacing between the magnetometers.

Figure 11A:
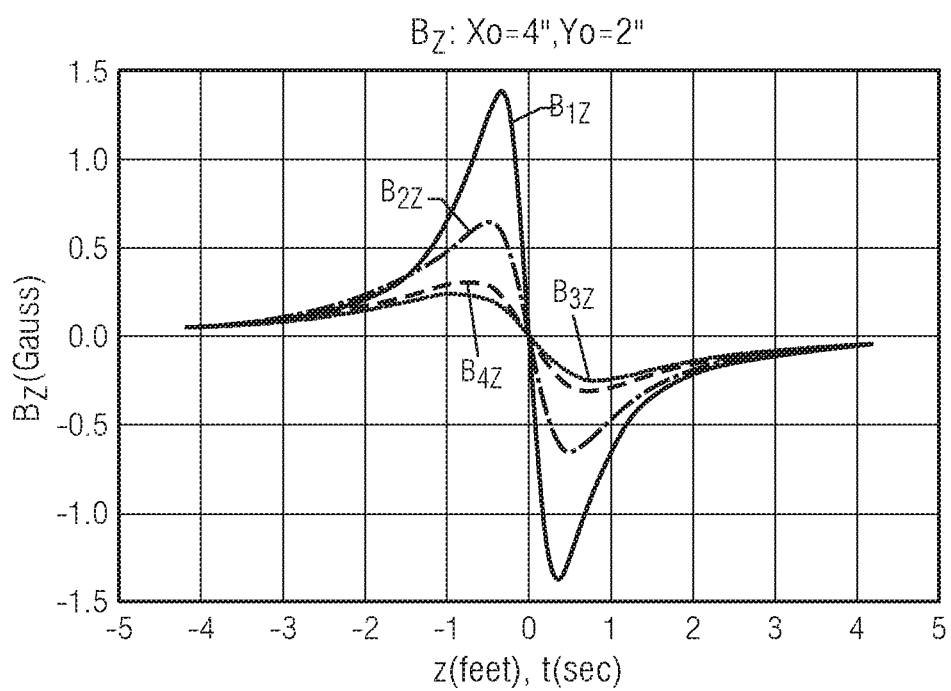
FIGS. 11A, 11B, and 11C depict plots of axial (11A), radial (11B), and tangential (11C) magnetic field strength versus the axial location of a drill pipe joint for an eccentered drill string.
Figure 11B:
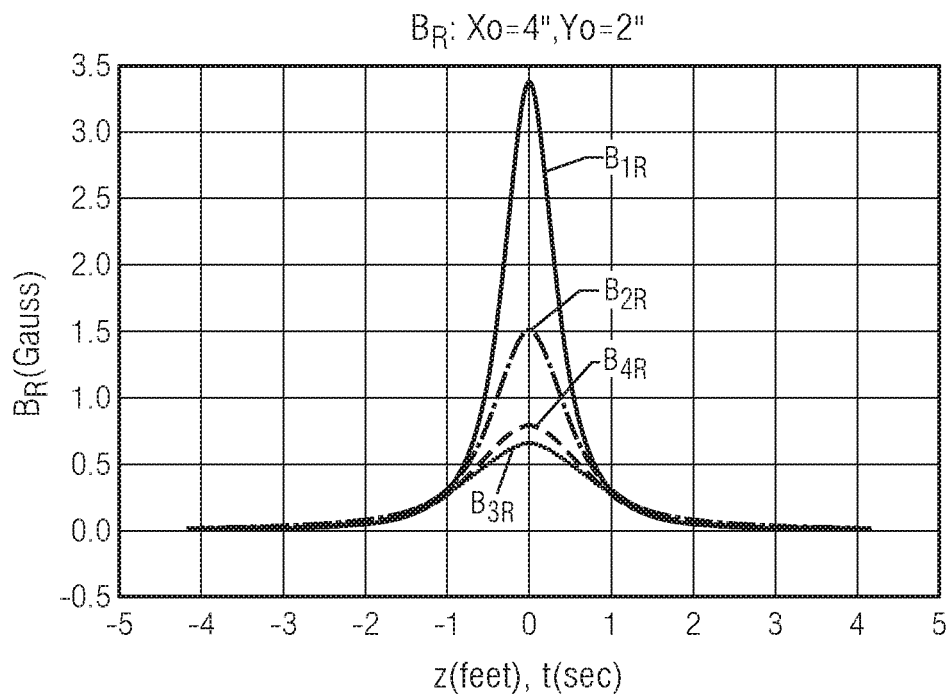
Figure 11C:
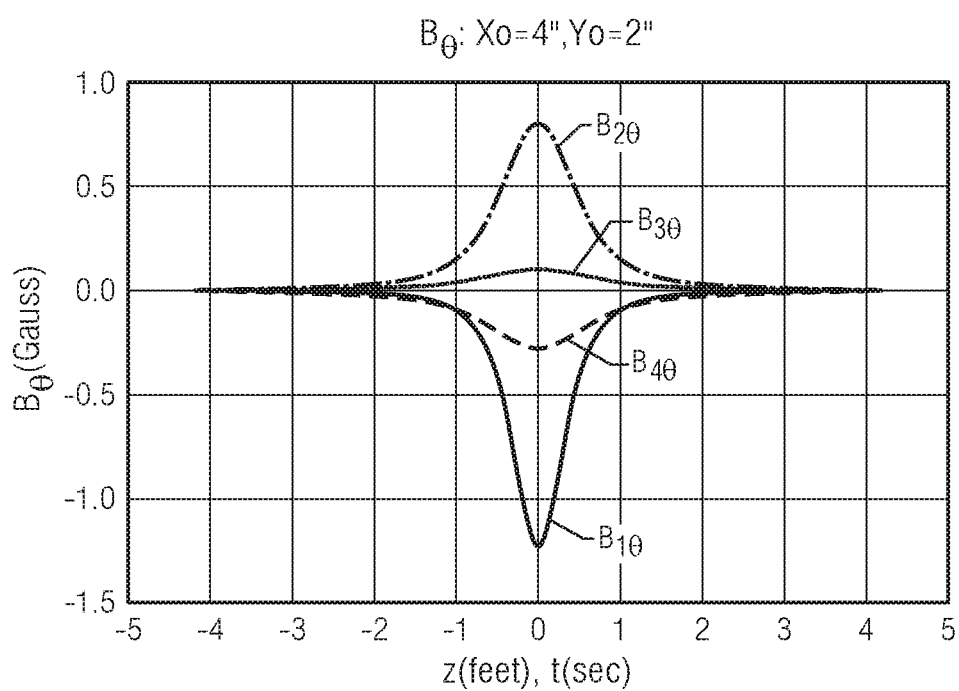

In embodiments in which the drill string is eccentered (off center) in the drilling riser (such that $X_0$ and/or $Y_0$ are not equal to zero), the magnetic field measurements made by each of the magnetometers may differ. For example, FIGS. 11A, 11B, and 11C depict plots of $B_Z$, $B_R$, and $B_\theta$ versus location of the joint along the z-axis (or time) for an embodiment in which $X_0=4''$ and $Y_0=2''$ for each of the four magnetometers. Note that magnetic field values measured by the first magnetometer ($B_{1Z}$, $B_{1R}$, and $B_{1\theta}$) are greater than the fields measured by the other magnetometers indicating that the drill pipe joint is located closest to the first magnetometer. The next largest fields are measured by the second magnetometer ($B_{2Z}$, $B_{2R}$, and $B_{2\theta}$) indicating that the drill pipe joint is located in the quadrant between the first and second magnetometers (e.g., as depicted on FIG. 9). The magnetic fields of the third ($B_{3Z}$, $B_{3R}$, and $B_{3\theta}$) and fourth ($B_{4Z}$, $B_{4R}$, and $B_{4\theta}$) magnetometers are significantly less than those of the first and second magnetometers.

It will be understood that during a drilling operation the drill string is generally more likely to be eccentered than centered. Therefore sensor embodiments including more than one magnetometer may be advantageous to ensure a strong magnetic signal in at least one magnetometer. However, the disclosed embodiments are not limited in this regard since as on FIGS. 11A-11C the data from a single magnetometer may be sufficient to detect a drill pipe joint and determine its axial location with respect to the z=0 plane.

Figure 12A:
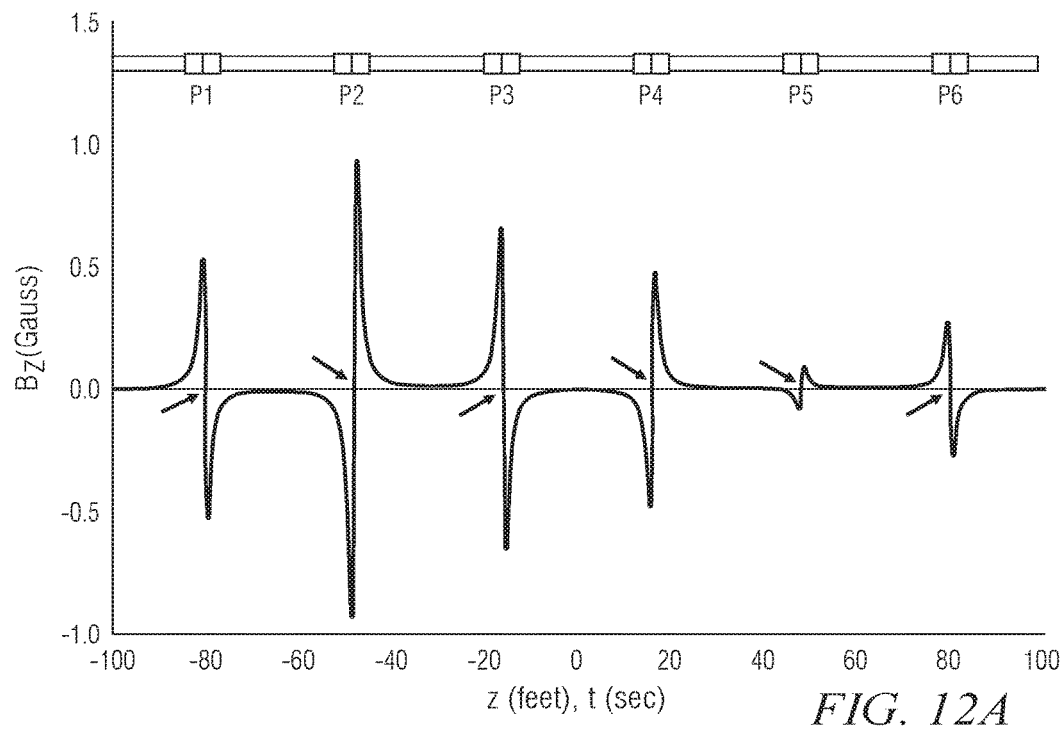
FIGS. 12A and 12B depict axial (12A) and radial (12B) magnetic field strength versus the axial location of a centered drill string section including six joints.
Figure 12B:
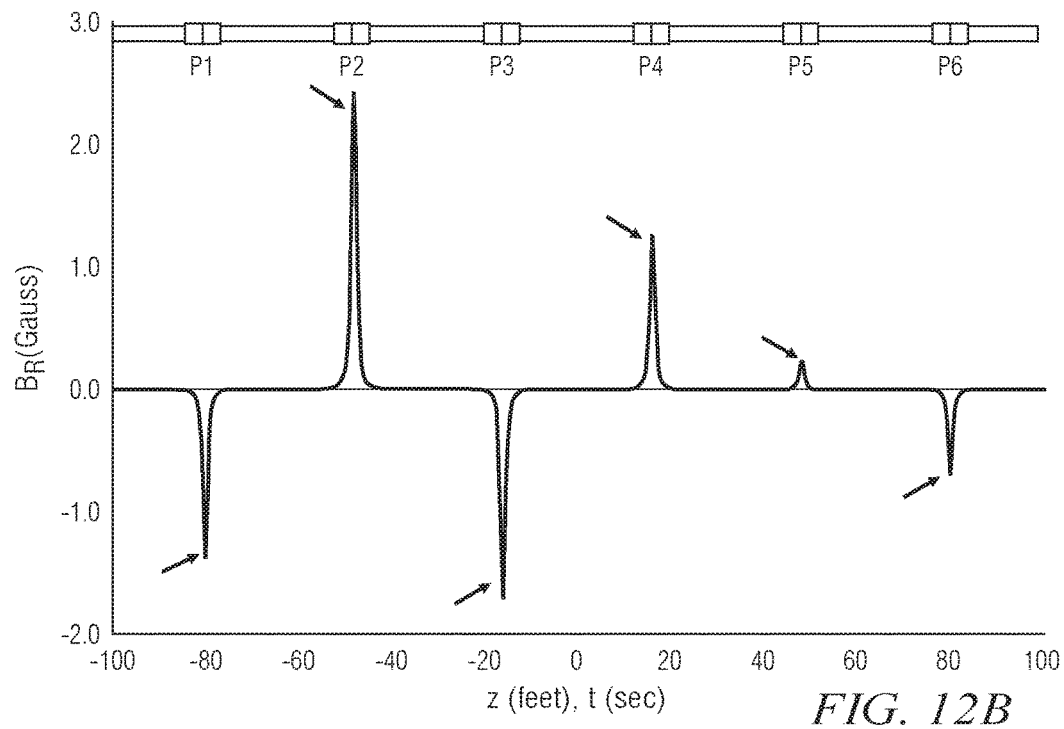

FIGS. 12A and 12B depict axial and radial magnetic fields $B_Z$ and $B_R$ for a drill string section including six joints. In this example, the pole strengths are as follows: P1=−88 μWb, P2=155 μWb, P3=−109 μWb, P4=80 μWb, P5=14 μWb, and P6=−45 μWb. The poles are centered on the z-axis and separated by 9.75 meters (32 feet). FIG. 12A shows that the axial magnetic field component $B_Z$ undergoes a zero-crossing at each drill pipe joint (as indicated by the arrows). FIG. 12B shows that the radial magnetic field component $B_R$ has an extremum (a maximum or minimum depending on the sign of the pole) at each drill pipe joint (as also indicated by the arrows). Referring back to FIGS. 11A-11C, for an eccentered drill string, the same features, namely zero crossings of $B_Z$, and extrema in $B_R$ and $B_\theta$ occur when a drill pipe joint passes through the plane in which the magnetometers are deployed. It will thus be understood that measurements of $B_Z$, $B_R$, and $B_\theta$ may be used to detect drill pipe joints as they move past the magnetometers while drilling or tripping.

In the examples described above with respect to FIGS. 10-12B, the riser section 100 including the magnetometers 162A-D has been assumed to be fabricated from a non-magnetic material (such as high strength stainless steel). The relative magnetic permeability of such materials is μ'=1 such that a non-magnetic riser section has substantially no effect on the static magnetic fields arising from the drill pipe joints. Hence, the magnetometers may be deployed directly on the outer surface of a non-magnetic riser section (e.g., as depicted on FIGS. 8 and 9). Such a construction is convenient in that there is no need to penetrate the wall of the riser section and therefore places minimal to no restriction on the size and number of magnetometers deployed.

It will be understood, however, that the disclosed embodiments are not limited to embodiments employing a non-magnetic riser section. In alternative embodiments, the riser section on which the magnetometer(s) is/are deployed may be fabricated from a magnetic material such as plain carbon steel having a magnetic permeability μ' in a range from about 50 to about 100. A magnetic riser section tends to "focus" the magnetic field lines into the riser and thereby reduce the field magnitude external to the riser section (e.g., at the magnetometers).

Figure 13:
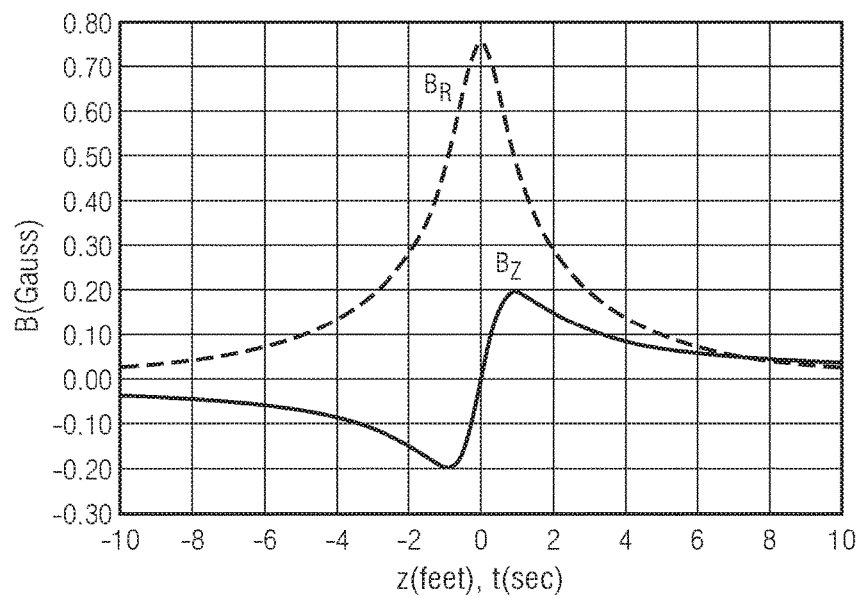
FIG. 13 depicts a plot of axial and radial magnetic field strength versus the axial location of a drill pipe joint deployed in a magnetic riser section.

FIG. 13 depicts a plot of magnetic field strength versus location of the joint along the z-axis for an example similar to that described above with respect to FIG. 10 in which the magnetometers are deployed on an outer surface of a riser section having a magnetic permeability μ'=100 (as opposed to μ'=1 in FIG. 10). Comparing FIGS. 10 and 13 indicates that the use of a magnetic riser section reduces the magnetic field magnitudes by approximately a factor of three. The magnetic riser section also broadens the response, increasing the full width half max of $B_R$ from about 1.2 feet for the nonmagnetic riser section to about three feet for the magnetic riser section. While the use of a magnetic riser section tends to distort the magnetic field emanating from the drill string, it should be noted that the magnetic pattern at the magnetometers retains the same features in that $B_R$ has an extrema at the drill pipe joint and $B_Z$ has a zero-crossing at the joint location.

Figure 14A:
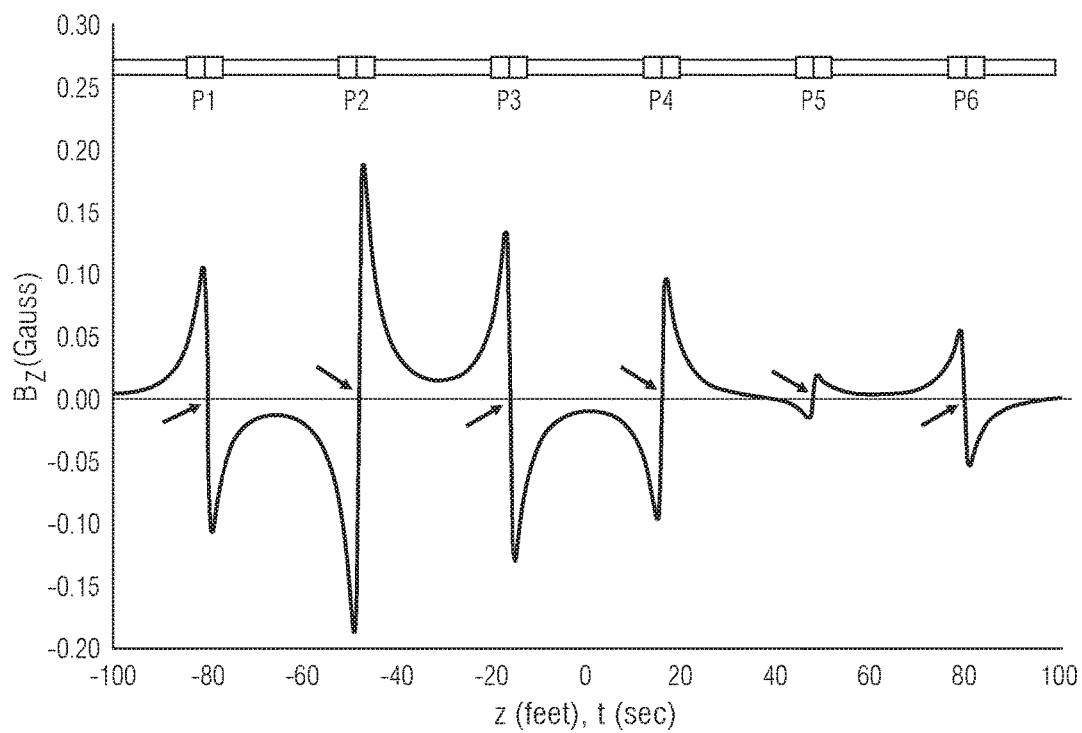
FIGS. 14A and 14B depict plots of axial (14A) and radial (14B) magnetic field strength versus the axial location of a centered drill string section including six joints deployed in a magnetic riser section.
Figure 14B:
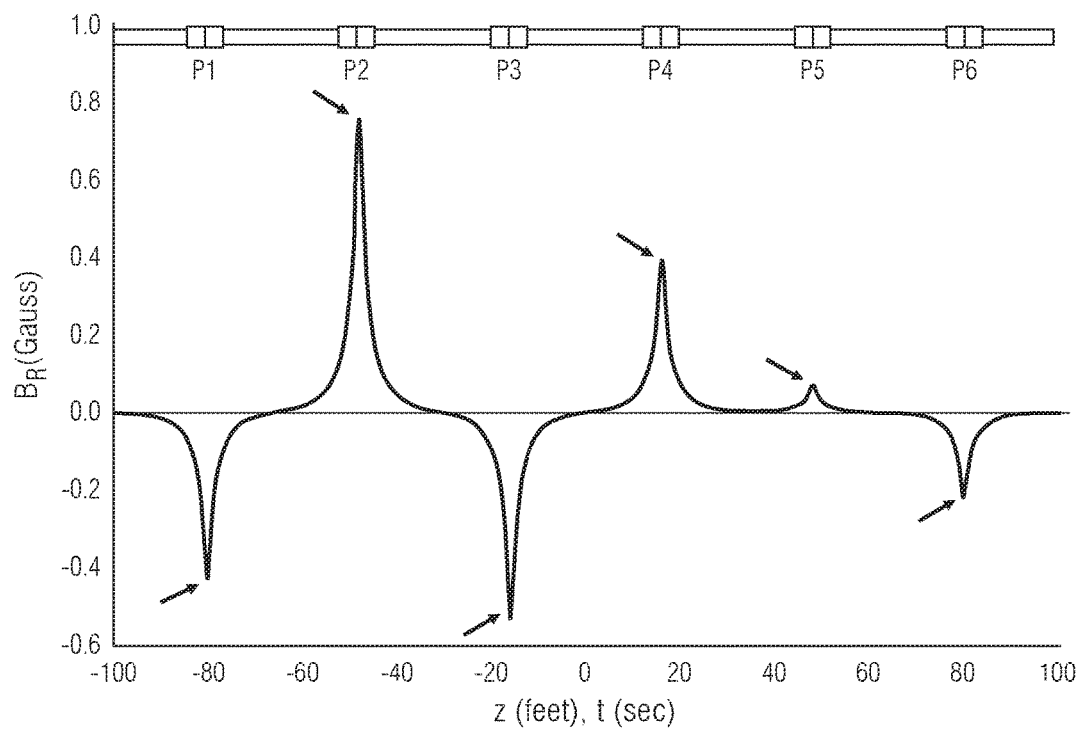

FIGS. 14A and 14B depict axial and radial magnetic fields $B_Z$ and $B_R$ for the same drill string section described above with respect to FIGS. 12A and 12B but deployed in a riser section having a magnetic permeability μ'=100 (as opposed to μ'=1 in FIGS. 12A and 12B). Comparing FIGS. 14A and 14B with FIGS. 12A and 12B indicates that the presence of the magnetic riser section reduces the magnetic field magnitudes by approximately a factor of three and broadens the response by increasing the width the magnetic peaks. However, the magnetic pattern at the magnetometers retains the same features in that $B_R$ has an extrema at each drill pipe joint and $B_Z$ has a zero-crossing at each joint location.

It will be appreciated that the modeling results presented in FIGS. 10 through 14B indicate that the disclosed embodiments may be suitable to determine the axial location of drill pipe joints in both magnetic and non-magnetic drilling riser sections. Moreover, the reduction in magnetic field strength caused by the magnetic riser section is not expected to significantly degrade the measurements, as triaxial fluxgate magnetometers having noise levels of less than $10^{-6}$ Gauss are well known and commercially available.

It will be further appreciated that the previous examples ignored the effects of background static magnetic fields (such as the Earth's magnetic field which ranges from about 0.25 to about 0.65 Gauss depending on where it is measured). The use of a magnetic riser section may also result in a static magnetic field. Provided that the magnetometers have sufficient dynamic range, any static magnetic fields may be subtracted from the dynamic magnetic fields emanating from the moving drill pipe. For example, the static magnetic field may be measured in an empty riser section before the drill string has been tripped past the magnetometers. The static field may then be subtracted from the dynamic data.

Figure 15A:
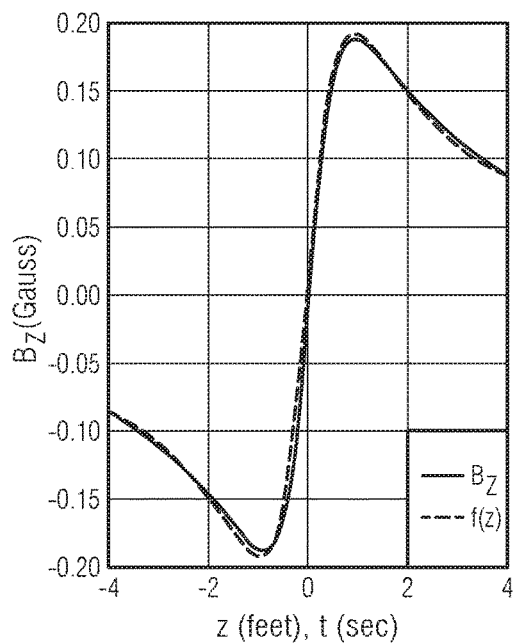
FIGS. 15A and 15B depict plots of axial (15A) and radial (15B) magnetic field strength and corresponding fitting functions versus the axial location of a drill pipe joint for a centered drill string in a magnetic riser section.

Curve fitting techniques may also be utilized to locate drill pipe joints when a static magnetic field is present. For example, the magnetometer data may be fit to a function including a variable portion and a DC offset. The magnetic fields presented on FIG. 13 are used for illustrative purposes. The measured magnetic field $B_Z(Z_0)$ may be fit, for example, to the following variable function:

$$f(Z_0) = \frac{AZ_0}{[(Z-Z_0)^2 + V]} + D \qquad (6)$$

where A is a fitting parameter related to the amplitude (magnitude), V is a fitting parameter related to the width, Z is a fitting parameter related to the location of the drill pipe joint, and D is the DC offset. A least squares minimization of $\Sigma[B_Z(Z_0)-f(Z_0)]^2$ over the range from −4 feet to +4 feet yields the dashed curve shown on FIG. 15A with fitting parameters: A=0.361, V=0.893, and Z=D=0. The solid curve is the modelled data $B_Z(Z_0)$ from FIG. 13.

Figure 15B:
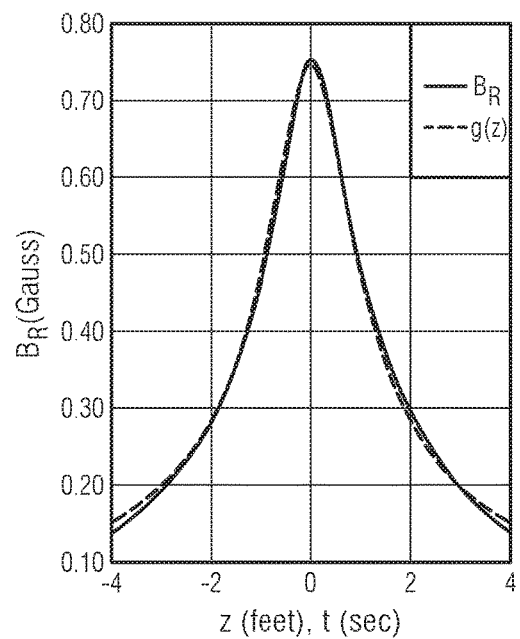

Likewise the measured magnetic field $B_R(Z_0)$ may be fit, for example, to the following variable function:

$$g(Z_0) = \frac{B}{[(Z-Z_0)^2 + W]^{0.5}} + E \qquad (7)$$

where B is a fitting parameter related to the amplitude (magnitude), W is a fitting parameter related to the width, Z is a fitting parameter related to the location of the drill pipe joint, and E is the DC offset. A least squares minimization of $\Sigma[B_R(Z_0)-g(Z_0)]^2$ over the range from −4 feet to +4 feet yields the dashed curve shown on FIG. 15B with fitting parameters: B=0.614, W=0.674, and Z=E=0. The solid curve is the modelled data $B_R(Z_0)$ from FIG. 13. In comparing FIGS. 15A and 15B, note that the quality of the curve fits is high and that $B_R$ and $B_Z$ yield the same location of the drill pipe joint.

In embodiments in which the magnetic field measurements span several drill pipe joints, for example, as depicted on FIGS. 12A and 12B, the magnetic field measurements surrounding each joint may be fit with functions such as $f(Z_0)$ and $g(Z_0)$. The width parameters V and W, and the dc offset values D and E depend primarily on the drilling riser (the riser section on which the magnetometers are deployed), and tend to be approximately equal from joint to joint. The amplitudes A and B may vary significantly from one tool joint to another since they depend on the random magnetization of the drill pipes. The use of fitting functions may improve the signal to noise ratio and improve the accuracy of locating tool joints.

Figure 16:
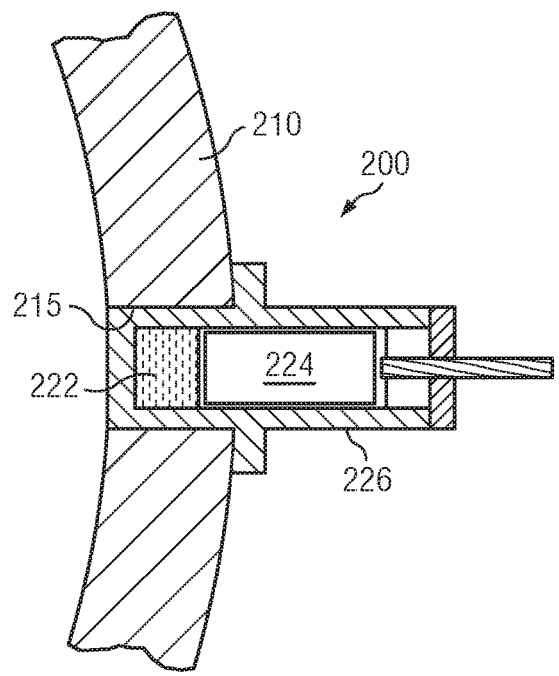
FIG. 16 depicts a portion of an alternative riser section embodiment in which a magnetometer is deployed in an opening in the riser wall.

In the riser section embodiments described above with respect to FIGS. 8 and 9, the magnetometers are deployed (e.g., mounted) on an outer surface of the riser section 100. FIG. 16 depicts a portion of an alternative riser section embodiment 200 in which the magnetometers are deployed in openings (e.g., holes) 215 in the riser wall 210. The triaxial magnetometer 222 and corresponding electronics 224 may be deployed in a non-magnetic pressure housing 226 which is in turn deployed in the opening 215 in the riser section 200. The pressure housing 226 is configured to seal the drilling riser against drilling fluid leakage as the hydrostatic pressure inside the riser tends to be significantly higher than outside (e.g., by as much as 5000 psi).

Figure 17A:
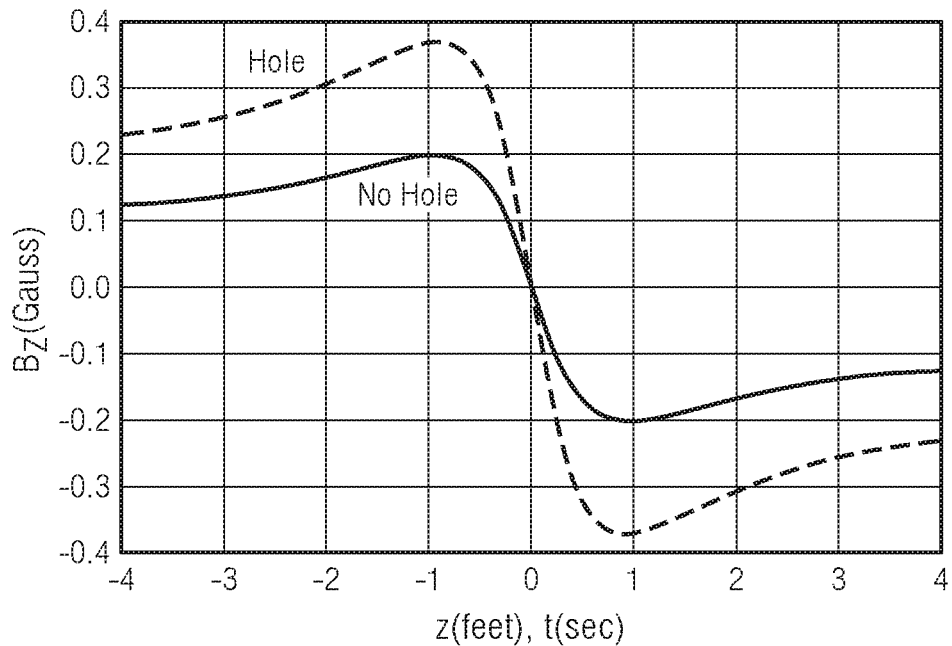
FIGS. 17A and 17B depict plots of axial (17A) and radial (17B) magnetic field strength for magnetometers deployed in a 1.5 inch opening in the wall of a magnetic drilling riser (as depicted on FIG. 16).
Figure 17B:
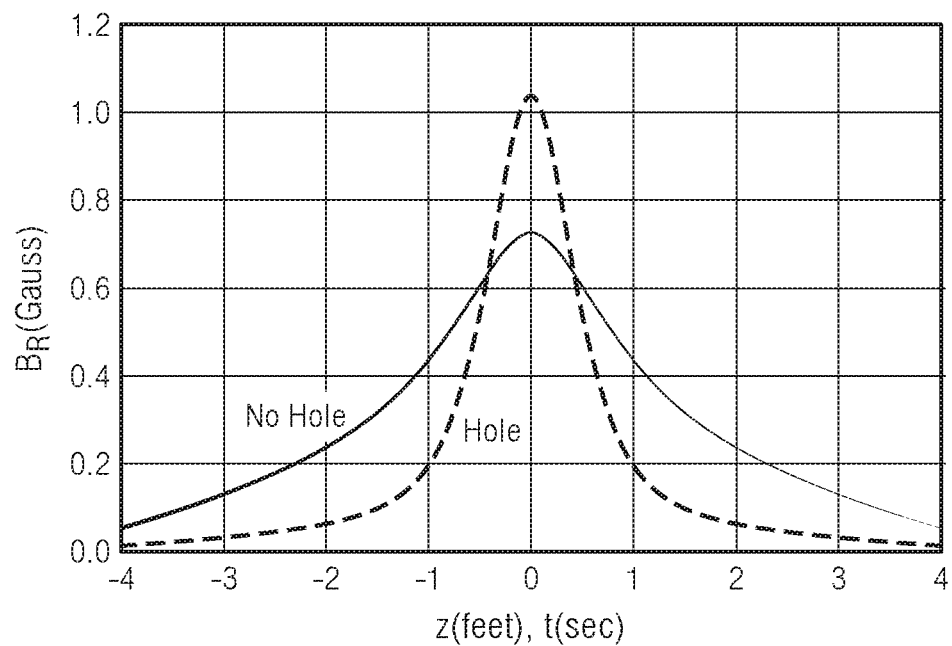

FIGS. 17A and 17B depict plots of axial and radial $B_Z$ and $B_R$ magnetic fields for magnetometers deployed in a 1.5 inch diameter hole (e.g., as depicted on FIG. 16) versus magnetometers deployed on the outer surface of the riser. The magnetic permeability of the riser section was $\mu'=100$ for both embodiments. As depicted on FIG. 17A, deploying the magnetometer in an opening in the riser wall nearly doubles the measured axial magnetic field strength as compared to deploying the magnetometer on the outer surface of the riser. As depicted on FIG. 17B, deploying the magnetometer in the opening in the riser wall both increases the radial magnetic field strength and sharpens the response (reduces the width of the extrema).

It will be appreciated the disclosed embodiments are not limited to deployment of the magnetic sensors in the drilling riser. As described above, the magnetic sensors may alternatively and/or additionally be deployed substantially anywhere in the subsea stack, for example, including the BOP, the LMRP, or a double studded adapter in the vicinity of the flex joint.

Figure 18:
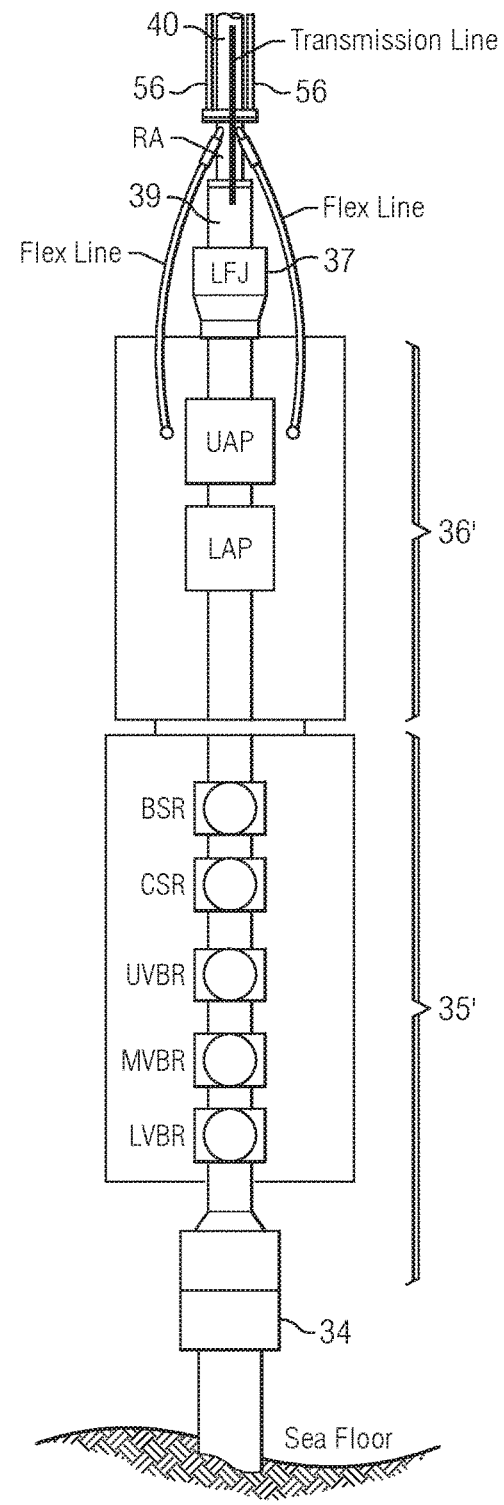
FIG. 18 depicts another embodiment of a subsea stack suitable for deployment of a magnetic sensor arrangement.

FIG. 18 depicts another embodiment of a subsea stack 60' including a riser adapter (RA), a double studded adapter (DSA) 39, a lower flex joint (LFJ) 37, a BOP 35' and an LMRP 36' deployed between a wellhead 34 and a drill riser 40. In the depicted embodiment, the BOP 35' includes a blind shear ram (BSR), a casing shear ram (CSR), an upper variable bore ram (UVBR), a middle variable bore ram (MVBR), and a lower variable bore ram (LVBR). The LMRP 36' includes an upper annular preventer (UAP) and a lower annular preventer (UAP). The LMRP 36' is coupled to the drilling riser 40 via flex joint 37, DSA 39, and the RA. The drilling riser 40 may optionally include a communication system and various auxiliary lines 56 that terminate at the RA.

FIGS. 19A-B depict longitudinal and circular cross sections of a DSA 39' employing a plurality of magnetometers 262A-D (circumferentially spaced about the DSA, for example, as previously described). In the depicted embodiment, each of the magnetometers 262A-D is deployed in corresponding electronics pockets 272 in a nonmagnetic DSA body 270 with sealed cover plates 274.

FIG. 19C depicts a block diagram of an example DSA electronic circuit 280. The magnetometers 262A-D may be electronically coupled with a processor 282 and memory 284. Batteries 285 may be employed to power the circuit. To conserve energy, the circuit may be configured to remain in a low power "stand-by" mode until it receives a command from the rig. The system may be fully activated, for example, when a kick is detected. The processor 282 may be configured to process the magnetometer measurements as described herein. Digitized magnetometer measurements may also be transmitted to the rig, for example via a transceiver 287 that connects the DSA 39' to the previously described drilling riser communication system.

Drill String Eccentricity

Riser embodiments employing multiple circumferentially spaced magnetometers (e.g., as depicted on FIGS. 8 and 9) may also be used to determine the eccentricity and/or the lateral position of the drill string inside the riser. Such measurements may be important for safety and reliability reasons. For example, a fully eccentered drill string in the BOP may prevent the blind shear rams from severing the drill pipe as was reported in the BP Macondo blow out. Moreover, if (or when) the drill string enters a parasitic drilling mode, such as forward whirl, reverse whirl, or chaotic whirl inside the drilling riser, the drill pipe and/or riser may be worn and/or damaged. In addition to potentially damaging the drill string and the riser, these parasitic modes also waste energy that was intended for drilling the hole. Such modes may be detected and identified by monitoring the instantaneous transverse (lateral) position of the drill pipe, which may allow the driller to mitigate the parasitic mode by altering the rotation rate of the drill string or the weight on bit.

Figure 20:
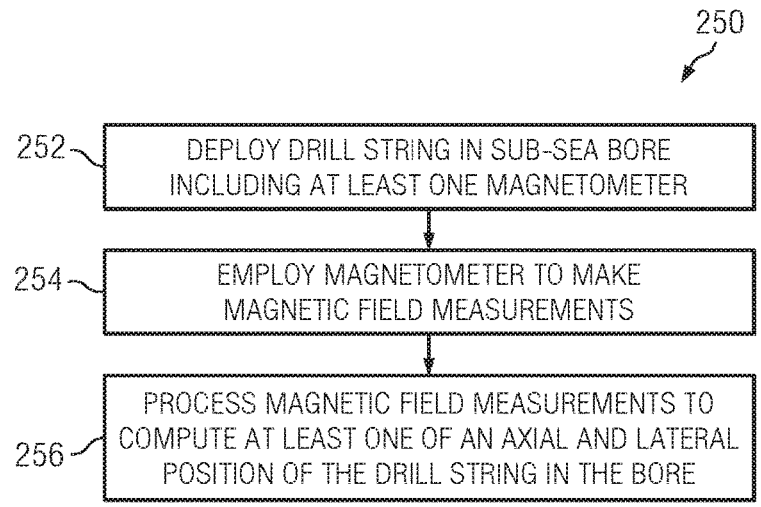
FIG. 20 depicts a flow chart of one disclosed method embodiment for determining the axial and/or lateral position of a drill string in a drilling riser.

FIG. 20 depicts a flow chart of one disclosed method embodiment 250 for determining the axial and/or the lateral position of a drill string in a drilling riser. A drill string is deployed in a subsea bore including a plurality of circumferentially spaced magnetometers deployed thereon (e.g., as described above with respect to FIGS. 8, 9, 16, and 19A-B) at 252. The magnetometer(s) may include, for example, triaxial magnetometers as described above. The riser section may be magnetic or non-magnetic. The magnetometers are used to make magnetic field measurements, for example, while the drill string moves axially in the riser (e.g., via tripping or drilling) at 254. The magnetic field measurements are then processed at 256 to compute at least one of the axial and the lateral position of drill pipe joints in the drill string. It will be appreciated that another application of determining the axial position is to improve the accuracy of the drill bit depth by referencing the depth to the seafloor, rather than to the floating MODU.

The magnetic field measurements acquired at 254 may be transmitted to the drilling platform (i.e., the surface) via substantially any means. For example, the magnetometers may be in electrical communication with a hard wired communications channel deployed in the drilling riser (such as the intelligent riser system disclosed in U.S. Provisional Patent Application Ser. No. 62/242,091). The magnetic field measurements may then be processed at the surface at 256.

The axial position of the drilling string joints may be determined at 256, for example, as described above with respect to FIGS. 10-15B, via determining a zero crossing or an extrema of the measured magnetic field component(s).

Various methods may be employed at 256 to compute the lateral position and/or the eccentricity of the drill string in the riser. In the example embodiments that follow, magnetic field measurements are made using four triaxial magnetometers located at 90 degree intervals about the circumference of the riser. However, as described above, it will be understood that the disclosed embodiment are not limited in this regard as substantially any plurality of magnetometers may be utilized to determine the lateral position of the drill string. Nor are the disclosed embodiments limited to the use of triaxial magnetometers as described in more detail below. Moreover, in the example embodiments that follow, the riser section on which the magnetometers are deployed is assumed to be non-magnetic. This assumption is for convenience only and is not intended to be limiting. These methods may be similarly applied for embodiments that employ a magnetic drilling riser (with the magnetometers deployed on the outer surface of the riser or in corresponding openings in the riser wall) or embodiments in which the magnetometers are deployed in the subsea stack (e.g., in the BOP, the LMRP, or the DSA).

The magnetometer measurements acquired at 254 of method 250 may be denoted as $\{H_{iZ}, H_{iR}, H_{i\theta}\}$, $i=1,2,3,4$. Model based results are denoted as $\{B_{iZ}, B_{iR}, B_{i\theta}\}$. One or more of the $H_{iZ}$ zero crossings and/or the $H_{iR}$ extrema may be evaluated to determine when the drill pipe joint is in the plane of the magnetometers (i.e., the z=0 plane). The cross axial magnetic field measurements $H_{1R}$, $H_{1\theta}$, $H_{2R}$, $H_{2\theta}$, $H_{3R}$, $H_{3\theta}$, $H_{4R}$, and $H_{4\theta}$ may be evaluated in combination with modelled values to determine the eccentricity (e.g., via minimizing a difference between the modelled and measured values). The modelled values may be computed, for example, as follows:

$$B_{1R} = \frac{P(X_0 - a)}{4\pi R_1^3}; B_{1\theta} = \frac{PY_0}{4\pi R_1^3}; \quad (8)$$
$$B_{2R} = \frac{P(Y_0 - a)}{4\pi R_2^3}; B_{2\theta} = \frac{PX_0}{4\pi R_2^3};$$
$$B_{3R} = \frac{P(X_0 + a)}{4\pi R_3^3}; B_{3\theta} = \frac{PY_0}{4\pi R_3^3};$$
$$B_{4R} = \frac{P(Y_0 + a)}{4\pi R_4^3}; B_{4\theta} = \frac{PX_0}{4\pi R_4^3};$$

where $$R_1 = \sqrt{(X_0 - a)^2 + Y_0^2}; R_2 = \sqrt{X_0^2 + (Y_0 - a)^2}; \quad (9)$$
$$R_3 = \sqrt{(X_0 + a)^2 + Y_0^2}; R_4 = \sqrt{X_0^2 + (Y_0 + a)^2};$$

The eccentricity is defined as follows: $R_0 = \sqrt{X_0^2 + Y_0^2}$ where $X_0$ and $Y_0$ are the unknown parameters that define the lateral position of the drill pipe joint in the riser. The monopole strength P is also an unknown. The radius a is known based on the geometry of the riser section and the deployment of the magnetometers. The eight cross axial magnetic field measurements are also known.

The position of the drill string may be computed, for example, via a least squares minimization of the following quantity:

$$\chi_1^2 = (B_{1R} - H_{1R})^2 + (B_{1\theta} - H_{1\theta})^2 + (B_{2R} - H_{2R})^2 + (B_{2\theta} - H_{2\theta})^2 + \quad (10)$$
$$(B_{3R} - H_{3R})^2 + (B_{3\theta} - H_{3\theta})^2 + (B_{4R} - H_{4R})^2 + (B_{4\theta} - H_{4\theta})^2$$

where $X_0$, $Y_0$, and P are allowed to float (as unknowns to be determined). A starting value for the unknown lateral position may be, for example, the center of the riser section (i.e., $X_0=0$ and $Y_0=0$). The initial magnitudes of the four vectors may therefore be $R_1=R_2=R_3=R_4=a$. The monopole strength P at any given pole may vary by orders of magnitude so selecting a good starting value may improve processing and accuracy. For example, the starting value may be computed from the radial magnetic field measurements using the following equation (or a similar equation if a different number of magnetic sensors are utilized):

$$P_0 = \pi a^2 \{|H_{1R}| + |H_{2R}| + |H_{3R}| + |H_{4R}|\} \quad (11)$$

The following examples further illustrate the disclosed embodiments but, of course, should not be construed as in any way limiting the scope of the disclosure. In these examples, magnetometers were located at a radius a=9.5" at 90 degree intervals about the riser section. A drill pipe joint having a radius b=3.5" and a monopole strength of P=100 μWb was deployed in the riser.

EXAMPLE 1

The drill pipe joint was eccentered in the z=0 plane at location $(X_0, Y_0, Z_0) = (4", 2", 0")$. Each of the magnetometers included a triaxial (3-axis) magnetometer. Random noise having a standard deviation of 0.1 Gauss was added to the true magnetic field values thereby generating the following simulated magnetic measurements (in units of Gauss):

| $H_{1R}$ | $H_{1\theta}$ | $H_{2R}$ | $H_{2\theta}$ | $H_{3R}$ | $H_{3\theta}$ | $H_{4R}$ | $H_{4\theta}$ |
|---|---|---|---|---|---|---|---|
| 3.320 | −1.187 | 1.425 | 0.844 | 0.635 | −0.027 | 0.759 | −0.354 |

A starting value for the monopole strength was computed to be $P_0 = 110$ μWb using Equation 11. The quantity $\chi_1^2$ (from Equation 10) was minimized using a non-linear minimization routine to obtain the following solution: $X_0 = 4.0"$, $Y_0 = 1.9"$, $R_0 = 4.5"$, and $P = 98$ μWb.

Figure 21:
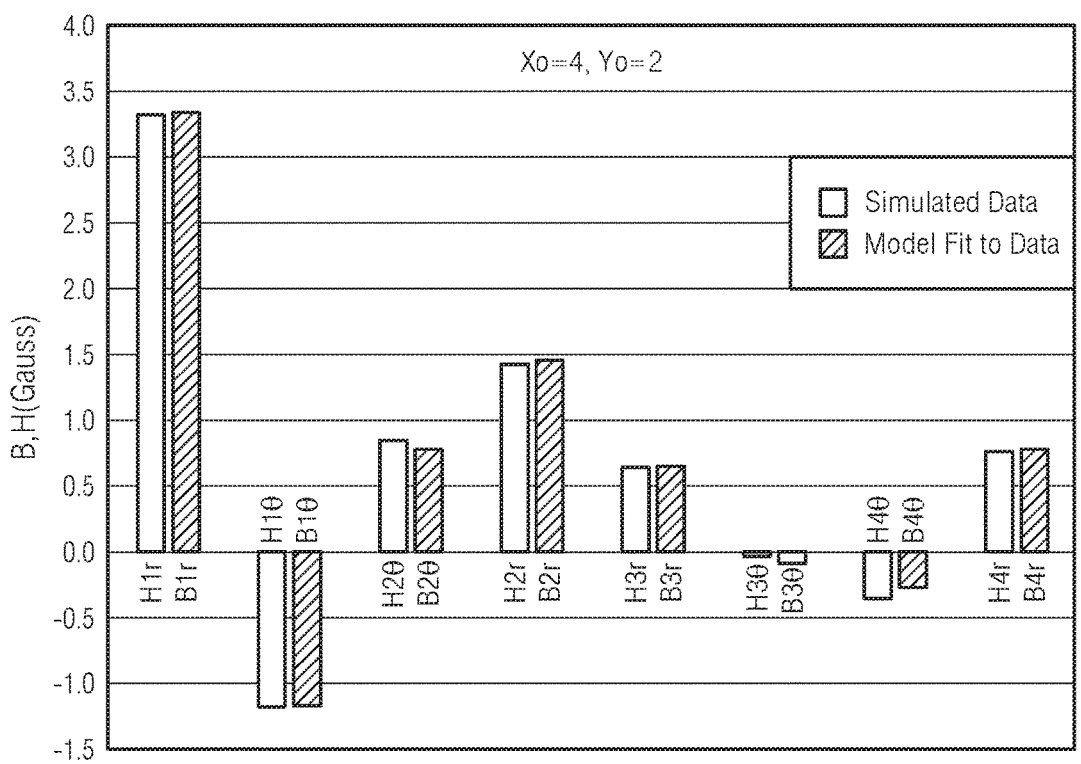
FIG. 21 depicts an example comparison of simulated magnetic field data and results of a least squares fit.

FIG. 21 depicts a comparison of the simulated magnetic field data and the results of the least squares fit. An excellent fit was obtained between the data and the model even with the large initial noise levels (0.1 Gauss) thereby allowing the lateral position of the drill pipe joint to be accurately located.

EXAMPLE 2

The lateral position of the drill pipe joint was determined using modelled tangential to radial magnetic field ratios. The following ratios were computed and tabulated versus $X_0$ and $Y_0$ in one inch increments:

$$\frac{B_{1\theta}}{B_{1R}}; -\frac{B_{2\theta}}{B_{2R}}; \frac{B_{3\theta}}{B_{3R}}; -\frac{B_{4\theta}}{B_{4R}}$$

It will be appreciated that the use of such ratios advantageously causes the P and $R_i$ values (in Equations 8 and 10) to cancel thereby simplifying the inversion. The calculated ratios are given in the tables depicted on FIGS. 22A, 22B, 22C, and 22D.

The tables in FIGS. 22A-22D may be used in combination to solve for the lateral position of the drill pipe joint ($X_0$ and $Y_0$). For example, using the same simulated magnetic field measurements as used in Example 1 (including the 0.1 Gauss random noise), the following ratios may be computed.

$$\frac{H_{1\theta}}{H_{1R}} = -0.358; -\frac{H_{2\theta}}{H_{2R}} = -0.531; \frac{H_{3\theta}}{H_{3R}} = 0.324; -\frac{H_{4\theta}}{H_{4R}} = 0.432$$

The computed ratios may be compared with the theoretical ratios, for example, as follows:

$$\chi_2^2 = \left(\frac{B_{1\theta}}{B_{1R}} - \frac{H_{1\theta}}{H_{1R}}\right)^2 + \left(\frac{B_{2\theta}}{B_{2R}} - \frac{H_{2\theta}}{H_{2R}}\right)^2 + \left(\frac{B_{3\theta}}{B_{3R}} - \frac{H_{3\theta}}{H_{3R}}\right)^2 + \left(\frac{B_{4\theta}}{B_{4R}} - \frac{H_{4\theta}}{H_{4R}}\right)^2$$

The quantity $\chi_2^2$ was computed at each $X_0$, $Y_0$ location in the tables depicted on FIGS. 22A-22D. The resultant $\chi_2^2$ values are given in the table depicted on FIG. 23. The lowest (minimum) value of $\chi_2^2$ is highlighted in the table on FIG. 23 and indicates the estimated lateral position of the drill pipe joint (at $X_0=4''$ and $Y_0=2''$ in this example). As with Example 1, the lateral position of the drill pipe joint was accurately determined. It will be understood that the mesh of grid points given in the tables shown on FIGS. 22A-23 were selected for illustrative purposes. A finer mesh may be readily computed to create a more detailed table (e.g., having 0.1 inch intervals). Moreover, interpolation between the grid points may further enable higher resolution.

While the tables on FIGS. 22A-22D were generated analytically using Equations 4 and 5, it will be understood that a more detailed representation of the magnetic field at the drill pipe joints may be computed using various numerical techniques, for example, including finite element modelling or via empirical laboratory measurements. Such techniques may enable the shape/geometry of a magnetic riser section to be accounted.

EXAMPLE 3

As in Example 1, the drill pipe joint was eccentered in the z=0 plane at location $(X_0, Y_0, Z_0)=(4'', 2'', 0'')$. In this third Example, each of the magnetometers included a biaxial (2-axis) magnetometer including an axial (z-axis) and a radial (r-axis) magnetic field sensor. While radial magnetometers were considered it will be appreciated that tangential magnetometers may also be equivalently utilized. Random noise having a standard deviation of 0.1 Gauss was added to the theoretical magnetic field values thereby generating the following simulated magnetic measurements (in units of Gauss):

| $H_{1R}$ | $H_{2R}$ | $H_{3R}$ | $H_{4R}$ |
|---|---|---|---|
| 3.320 | 1.425 | 0.635 | 0.759 |

A starting value for the monopole strength was computed to be $P_0=110$ μWb using Equation 11. The quantity x was minimized using a non-linear minimization routine:

$$\chi_3^2 = (B_{1R}-H^{1R})^2 + (B_{2R}-H_{2R})^2 + (B_{3R}-H_{3R})_2 + (B_{4R}-H_{4R})_2$$

Minimization of $\chi_3^2$ yielded the following solution: $X_0=3.8''$, $Y_0=1.7''$, $R_0=4.2''$, and $P=98$ μWb.

Although magnetic detection of drill pipe connections (joints) and certain advantages thereof have been described in detail, it should be understood that various changes, substitutions and alternations can be made herein without departing from the spirit and scope of the disclosure as defined by the appended claims.

What is claimed is:

1. A system for determining a location of a drill pipe joint deployed in a bore; the system comprising:
    a drill string deployed in a bore; the drill string including a drill pipe joint at which first and second drill pipes are connected to one another, the drill string having a permanent magnetization wherein the first and second drill pipes each have a north pole at one end and a south pole at another axial opposing end such that magnetic flux emanates from the drill string at the drill pipe joint;
    at least one magnetometer deployed on the bore, the magnetometer in sensory range of the magnetic flux emanating from the permanent magnetization of the drill string; and
    a processor in electronic communication with the magnetometer and configured to process magnetic field measurements made by the magnetometer of the magnetic flux emanating from the permanent magnetization of the drill string to determine at least one of an axial position and a lateral position of the drill pipe joint.

2. The system of claim 1, wherein the at least one magnetometer is deployed on at least one of a drilling riser, a subsea stack, a blowout preventer, a lower marine riser package, and a double studded adapter.

3. The system of claim 1, further comprising a plurality of circumferentially spaced magnetometers deployed in a common cross axial plane of a lowermost riser section in a drilling riser, each of the magnetometers in sensory range of the permanent magnetization of the drill string.

4. The system of claim 3, wherein the magnetometers are deployed a predetermined distance above a blind shear ram or a casing shear ram.

5. The system of claim 3, wherein the magnetometers are deployed on an outer wall of the riser section or in a corresponding hole in the outer wall of the riser section.

6. The system of claim 1, further comprising a plurality of circumferentially spaced magnetometers deployed in a common cross-axial plane of a double studded adapter.

7. The system of claim 1, comprising at least 3 circumferentially spaced magnetometers, wherein adjacent ones of the magnetometers have a circumferential spacing of less than or equal to 120 degrees.

8. The system of claim 1, wherein wherein each of the at least one magnetometer comprises a triaxial magnetometer, a first axis of which is substantially parallel with a longitudinal axis of the central tube, a second axis of which is substantially parallel with a radial direction on the central tube, and a third axis of which is substantially parallel with a tangential direction on the central tube.

9. The system of claim 8, wherein the processor is configured to process at least one of an axial location of a zero crossing of an axial component of the magnetic field measurements made in (b) and (ii) an axial location of an extrema of a radial component or a tangential component of the magnetic field measurements made in (b) to compute the axial position of the drill pipe joint in the bore.

10. The system of claim 8, wherein the processor is configured to process differences between at least one of radial and tangential components of the magnetic field measurements made in (b) in combination with at least one of corresponding radial and tangential components of modeled magnetic field measurements to compute the lateral position of the drill pipe joint in the bore.

11. A riser section for a subsea drilling riser, the riser section comprising:
    a central tube configured for receiving a drill string, the drill string having a permanent magnetization wherein the first and second drill pipes each have a north pole at one end and a south pole at another axial opposing end such that magnetic flux emanates from the drill string at the drill pipe joint;

first and second connectors deployed on opposing axial ends of the central tube, the connectors configured to physically connect axially adjacent riser sections to one another; and a plurality of circumferentially spaced magnetometers deployed on the central tube, the magnetometers deployed on a common cross-axial plane, each of the magnetometers in sensory range of the magnetic flux emanating from the permanent magnetization of the drill string in the central tube; and wherein each of the magnetometers comprises a triaxial magnetometer, a first axis of which is substantially parallel with a longitudinal axis of the central tube, a second axis of which is substantially parallel with a radial direction on the central tube, and a third axis of which is substantially parallel with a tangential direction on the central tube.

12. The riser section of claim 11, further comprising:

at least one half-inductive coupler deployed on the first connector;

an electrical conductor electrically connected to half-inductive coupler and deployed along a length of the central tube; and wherein each of the plurality of magnetometers is in electronic communication with the electrical conductor.

13. The riser section of claim 11, comprising at least 3 circumferentially spaced magnetometers, wherein adjacent ones of the magnetometers have a circumferential spacing of less than or equal to 120 degrees about the circumference of the central tube.

14. The riser section of claim 11, wherein the plurality of magnetometers are deployed on an outer wall of the central tube or in a corresponding hole in the outer wall of the central tube.

15. The riser section of claim 11, wherein the central tube is fabricated from nonmagnetic steel.

16. A method for determining at least one of an axial and a lateral position of a drill pipe joint in a subsea bore; the method comprising:

(a) deploying a drill string in a subsea bore, the drill string including a drill pipe joint at which first and second drill pipes are connected to one another, the bore including at least one magnetometer deployed thereon, the first and second drill pipes having a permanent magnetization wherein each has a north pole at one end and a south pole at another axial opposing end such that magnetic flux emanates from the drill string at the drill pipe joint;

(b) causing the at least one magnetometer to make a plurality of magnetic field measurements of magnetic flux emanating from the permanent magnetization with the drill string at a corresponding plurality of axial positions in the bore; and (c) processing the plurality of magnetic field measurements of the magnetic flux emanating from the permanent magnetization to compute at least one of the axial and the lateral position of the drill pipe joint in the bore.

17. The method of claim 16, wherein the bore includes a plurality of circumferentially spaced magnetometers.

18. The method of claim 16, wherein (c) further comprises processing at least one of (i) an axial location of a zero crossing of an axial component of the magnetic field measurements made in (b) and (ii) an axial location of an extrema of a radial component or a tangential component of the magnetic field measurements made in (b) to compute the axial position of the drill pipe joint in the bore.

19. The method of claim 16, wherein (c) further comprises processing differences between at least one of radial and tangential components of the magnetic field measurements made in (b) in combination with at least one of corresponding radial and tangential components of modeled magnetic field measurements to compute the lateral position of the drill pipe joint in the bore.

20. The method of claim 19, wherein (c) further comprises minimizing a sum of squares of the differences to compute the lateral position of the drill pipe joint in the bore.

21. The method of claim 16, wherein (c) further comprises processing ratios of tangential to radial components of the magnetic field measurements made in (b) with corresponding ratios of modelled magnetic field measurements to compute the lateral position of the drill pipe joint in the bore.

22. The method of claim 21, wherein (c) further comprises minimizing a sum of squares of differences between the ratios of modelled magnetic field measurements and said ratios of the magnetic field measurements made in (b) to compute the lateral position of the drill pipe joint in the bore.

* * * * *